(12) United States Patent
Myo et al.

(10) Patent No.: US 6,745,960 B1
(45) Date of Patent: Jun. 8, 2004

(54) CENTRIFUGALLY ROLLING GRANULATING DEVICE AND METHOD OF TREATING POWDER AND GRANULAR MATERIAL USING THE DEVICE

(75) Inventors: Nagayoshi Myo, Tokyo (JP); Akira Iwasaki, Tokyo (JP); Hiroshi Okada, Tokyo (JP); Kuniaki Yamanaka, Tokyo (JP); Koji Nagaoka, Tokyo (JP); Mamoru Shiratori, Tokyo (JP)

(73) Assignee: Freund Industrial Co., Ltd., Tokyo (JP)

( * ) Notice: Subject to any disclaimer, the term of this patent is extended or adjusted under 35 U.S.C. 154(b) by 218 days.

(21) Appl. No.: 10/009,299
(22) PCT Filed: Jun. 5, 2000
(86) PCT No.: PCT/JP00/03645
§ 371 (c)(1),
(2), (4) Date: Dec. 4, 2001
(87) PCT Pub. No.: WO00/74834
PCT Pub. Date: Dec. 14, 2000

(30) Foreign Application Priority Data

| Jun. 7, 1999 | (JP) | 11-159429 |
| Oct. 19, 1999 | (JP) | 11-296762 |
| May 25, 2000 | (JP) | 2000-155278 |

(51) Int. Cl.$^7$ .............................................. B02C 23/24
(52) U.S. Cl. ........................ 241/5; 241/18; 241/57; 241/284; 427/213
(58) Field of Search .......................... 241/5, 33, 39, 241/65, 57, 23, 18, 275, 284; 477/213

(56) References Cited

U.S. PATENT DOCUMENTS

| 3,819,332 A | 6/1974 | Jaccard et al. | |
| 4,623,098 A | * 11/1986 | Motoyama et al. | 241/46.04 |
| 4,736,895 A | * 4/1988 | Huttlin | 241/40 |

FOREIGN PATENT DOCUMENTS

| EP | 0 728 519 A | 8/1996 |
| JP | 46-10878 | 3/1971 |
| JP | 46-22544 | 6/1971 |
| JP | 59-49838 | 3/1984 |
| JP | 61-834 | 1/1986 |
| JP | 61-8736 | 3/1986 |
| JP | 61-242628 | 10/1986 |
| JP | 62-65729 | 3/1987 |
| JP | 6-319978 | 11/1994 |
| JP | 7-299348 | 11/1995 |
| WO | WO 97/20625 | 6/1997 |

OTHER PUBLICATIONS

Copy of EPC Search Report Ser. No. EP 00 93 1701 dated Mar. 28, 2003.

* cited by examiner

*Primary Examiner*—Mark Rosenbaum
(74) *Attorney, Agent, or Firm*—McCormick, Paulding & Huber LLP

(57) ABSTRACT

A centrifugal tumbling granulating apparatus 1 comprises a fixed wall 7 having a grain contact portion 7a which is in contact with powder grains 2 and of which a horizontal section is formed in a circular shape, and a rotating disk 5 provided a clearance 12 away from an inner side of the fixed wall 7 and rotating in a horizontal direction by a motor 13, wherein an air supply device 21 for supplying drying air 22 to an upper surface side of the rotating disk 5 is provided above the rotating disk 5. The air supply device 21 has a cylindrical straight tube portion 25, and an air supply port 23 formed in a cone shape, and is disposed in a centrifugal tumbling chamber 6 to be movable in an up-and-down direction. During a granulating step, the air supply device 21 stops to supply the dry air 22 and waits at an upper position H. After the granulation processing, the air supply device is lowered at a lower position L and supplies the dry air 22 onto the rotating disk 5 to dry granulated substances. As a result, the granulating apparatus capable of efficiently obtaining, in a single apparatus, spherical particles of which each particle size is small and which exist within a narrow range of particle size distribution and of which deviation from spherical form is small is provided.

28 Claims, 18 Drawing Sheets

CENTRIFUGALLY ROLLING GRANULATING DEVICE AND METHOD OF TREATING POWDER AND GRANULAR MATERIAL USING THE DEVICE

CROSS-REFERENCE TO RELATED APPLICATIONS

This application is entitled to the benefit of and incorporates by reference essential subject matter disclosed in PCT Application No. JP00/03645 filed on Jun. 5, 2000, and the following Japanese Patent Applications: No. 11-159429 filed on Jun. 7, 1999; No. 11-296762 filed on Oct. 19, 1999; No. 2000-155278 filed on May 25, 2000, all in the name of Freund Industrial Co., Ltd.

TECHNICAL FIELD

The present invention relates to a granulation processing technology of powder grains, and more particularly to a technology effective in the case of granulating spherical particles of medical supplies, foodstuffs and the like by a centrifugal tumbling granulating apparatus.

BACKGROUND ART

Conventionally, there have been many types of power grain granulating apparatuses, and granulation processing is performed by various methods such as a tumbling granulating method, an agitating granulating method, an extruding granulating method, a disintegration granulating method, a fluidized bed method or the like by using these apparatuses. Among these methods, the most optimum method of obtaining spherical or nearly spherical grains is the tumbling granulating method that granulates the powder during tumble. A tumbling granulating apparatus for performing this is roughly classified into the following two types. That is, there are a type of rotating a container body f formed in a drum shape, an oblique shape, an oblique cone shape or the like, and a type of disposing a rotating disk on a bottom portion of a cylindrical container and of tumbling powder grains thereon, for example, similarly to an apparatus that has been disclosed in Japanese Patent Publication No. 46-10878 or Japanese Patent Publication No. 46-22544.

The apparatus that is the type of rotating the container is mainly used in granulation of ores, fertilizers or the like, and generates relatively large particles existing within a wide range of a particle size distribution. On the other hand, the apparatus that is the type of rotating the disk is also called a centrifugal tumbling granulating apparatus (hereinafter denoted briefly by a CF apparatus), and gives particles centrifugal force caused by rotation of the rotating disk and thereby performs spherical granulation. Therefore, the apparatus of this type can obtain small granulated substances existing within a narrow range of the particle size distribution, and so is generally used in fields of medical supplies, foodstuffs or the like.

In the CF apparatus combining the cylindrical container and the rotating disk with each other, a narrow annular slit is formed between an inner wall of the cylindrical container and an outer edge portion of the rotating disk. The above-mentioned slit has a narrow width in order to prevent particles in the container from falling from the rotating disk, and can supply air thereto in a down to up directions. Further, in the CF apparatus, since the rotating disk is rotated during supply of air into this slit, the particles on the rotating disk is tumbled by using the centrifugal force and thereby performs the spherical granulation.

However, in the CF apparatus like this, since the slit formed around the rotating disk has a narrow width, flow amount of air (slit air) passing through the slit is small and so hardly contributes to drying of particles generated. Accordingly, the CF apparatus itself is poor in a capacity of drying, and the generated spherical particles are transferred to another drying device and thereby are dryly processed. That is, the generated particles are taken out of the CF apparatus, and are dried in another fluidized bed device or the like, and are formed into products. Therefore, the good spherical particles have been obtained, but there arises a problem of productivity. So, improvement thereof is desired.

Thereupon, as disclosed in Japanese Patent Publication No. 61-8736, Japanese Patent Laid-Open No. 62-65729, Japanese Patent Laid-Open No. 59-49838 or the like, a tumbling granulating apparatus combining a cylindrical container and a rotating disk with each other has been developed by adding a drying function thereto, and has recently been sold at markets as a multifunction type granulating coating apparatus. For example, a Spir-A-Flow (a trade name) or the like made at Freund Industrial Co, Ltd. is an example thereof. In the apparatus of this Spir-A-Flow, a ventilation portion is provided in a rotating disk, and air is introduced from a down direction of this ventilation portion, such that granulation and drying processings can be performed inside the same apparatus. That is, such the multifunction type apparatus can supply air from the above-mentioned ventilation portion along with or after the granulation processing, and thereby make the granulated substances drying. Therefore, since it is not necessary to transfer the generated substances to another drying device and to dry the generated substances, enhancement in the productivity thereof can be achieved.

On the other hand, besides the device in which the ventilation portion like this is formed, for example, a device, as disclosed in Japanese Patent Laid-Open No. 61-242628, has also been proposed such that a slit formed between a cylindrical container and a rotating disk has a wide width to increase flow amount of slit air. In this device, since powders are easy to fall from the slit in accordance with enlargement of the slit width, a slit portion is further provided with a powder fall prevention mechanism. In this apparatus, while the powders are prevented from falling from the slit portion by this mechanism, enhancement of the drying capacity is achieved by the slit air amount increased. Some of the multifunction type apparatuses described above are designed to improve the drying capacity by the slit air amount increased, too.

In these apparatuses, a fluidized layer can also be formed in the container by the increased amount of air or slit air supplied from the ventilation portion, so that it is possible to granulate particles of various shapes from heavy spherical particles to light amorphous particles. Moreover, the above-mentioned apparatuses can be used even in coating of particles, and so has widely used as multifunction type apparatuses capable of performing various granulating coating processings.

However, in manufacture of spherical particles which have small deviation from spherical form and exist within a narrow range of the particle size distribution, researches of inventors have discovered that properties of granulated substances obtained by these multifunction type apparatuses are inferior to properties of granulated substances obtained by the CF apparatus having no drying function. Recently, in particular, spherical particles that each have a small size and exist within a narrow range of the particle size distribution have been demanded in pharmaceutical manufacture.

However, since such granulated substances can not be manufactured by the above-mentioned multifunction type apparatuses, improvement thereof has been required.

In the multifunction type apparatuses described above, since powder grains are subject to buoyancy by air passing through the ventilation portion or the like and is not affected by sufficient tumbling action and compressing action, the inventors have surmised that properties of granulated substances are not improved. To avoid this, however, if the circulating air amount is decreased, then powder grains can not be prevented from falling from the ventilation portion or the like and drying capacity thereof is degenerated. Therefore, it is necessary to secure the air circulating amount equal to or more than a certain volume, and properties of granulated substances can not avoid lowering in comparison with those manufactured by the CF apparatuses having no drying function.

Further, in the conventional CF apparatus, properties of granulated subjects obtained are good, but a drying function is provided therein, and so it takes time and labor to transfer the granulated subjects to another drying device as described above, and a problem of productivity thereof has not been solved.

In FIG. 5 disclosed in Japanese Patent Publication No. 46-10878 or FIG. 2 and FIG. 3 disclosed in Japanese Patent Publication No. 46-22544, an apparatus has been proposed in which an air suction port is provided in an upper space of a centrifugal tumbling granulating apparatus. However, even if the air suction port is provided at a position remote from the rotating disk in this apparatus, then the air suction port has hardly contributed to drying of granulated substances, and so this apparatus has not practically been utilized.

On the other hand, in the conventional centrifugal tumbling granulating apparatuses, the above-mentioned cylindrical container is usually formed of materials having no adiabatic characteristic such as stainless steel plate or the like, and therefore the centrifugal tumbling chamber formed above the rotating disk is directly cooled by the outside air. In order to perform a granulation processing, a coating processing and the like, substances to be processed in the container are sprayed with an aqueous solution. However, due to this, the inside of the above-mentioned container comes to a damp atmosphere, and there occur portions having a temperature of the dew point or less in the inner surface of the centrifugal tumbling chamber. And, moisture existing in the centrifugal tumbling chamber becomes dewing on these portions.

Once such dewing occurs, binder splash or powder adheres to the moisture and is dissolved therein. This results in a function as adhesive, and so the powder grains adhere thereto. And, since each of the powder grains acts as a kernel, other powder grains further adhere to the powder grains and spread over the entire inside surface of the fixed wall. Because of this, it takes time and labor to clean the apparatuses and further there arises a problem of giving bad influence on the product yield and operation efficiency of the apparatuses.

Moreover, in the centrifugal tumbling granulating apparatuses, if powder grains are easy to slip on the surface of the rotating disk, then this impedes tumbling motion thereof, and the powder grains are centrifugally tumbled and granulated or are powder-coated certainly, and rotation speed of the rotating disk can not be raised. As a result, there also arises a problem of efficiency in production. Further, since tight granules, small-quantity processing or the like is difficult to perform, improvement of production capacity has been desired.

Further, in the case of sending air onto the rotating disk from a vertical direction, air is sent linearly. Therefore, it is easy to send air through an upper portion of the rotating disk, and time required to pass through the rotating disk is likely to shorten. As a result, there have also arisen such problems that tumbling of the powder grains is not satisfactorily promoted and efficiency in processing thereof is not good. Further, since contact time between an air stream and the respective powder grains is apt to shorten, there have also arisen such problems that stay time staying in powder grain layers of the air stream becomes short, and the drying efficiency is difficult to enhance.

An object of the present invention is to provide a granulating apparatus capable of efficiently manufacturing spherical particles which each have a small particle size and exist within a narrow range of particle size distribution and have small deviation from spherical form, in a single apparatus.

Further, an object of the present invention is to prevent a centrifugal tumbling granulating apparatus having an air supply means above a rotating disk, from generating dewing in a centrifugal tumbling chamber. Further, another object of the present invention is to prevent powder grains on the rotating disk from slipping and to centrifugally tumble and granulate the powder grains certainly. In addition, another object of the present invention is to lengthen contact time between an air stream and respective powder grains and thereby to enhance drying efficiency thereof.

These and other objects and novel features of the present invention will be apparent from description of the present specification and the accompanying drawings.

DISCLOSURE OF THE INVENTION

A centrifugal tumbling granulating apparatus that is the present invention is characterized by a fixed wall having a grain contact portion which is in contact with powder grains and of which a horizontal section is formed at least in a circular shape; a rotating disk provided a predetermined clearance away from an inner side of said fixed wall and rotating in a horizontal direction by a rotary driving means; and an air supply means disposed above said rotating disk and close to said rotating disk, and supplying gas to an upper surface side of said rotating disk.

Due to this, the centrifugal tumbling granulating apparatus that is the present invention can, similarly to the conventional centrifugal tumbling granulating apparatus, granulate heavy spherical particles of which each particle size is small and which exist within a narrow range of particle size distribution, and further perform, in the same apparatus, granulation processing of generated substances after the granulation processing. Therefore, it is unnecessary to transfer the generated substances to other drying devices and then to perform drying processing, and so improvement of the productivity can be achieved.

In this case, said air supply means may supply gas to said rotating disk from above the central part of said rotating disk. And, said air supply means may have a cylindrical straight tube portion, and an air supply port which communicates with said straight tube portion and is disposed below said straight tube portion and of which a lower end side is enlarged in a radius direction of said portion and is formed like a cone. Further, said air supply means may supply gas to said rotating disk from above a peripheral part of said rotating disk. In addition, said air supply means may be provided to be movable in an up-and-down direction between a lower position close to said rotating disk and an upper position more remote from said rotating disk than said lower position.

In addition, said air supply means may be disposed in such a state that a part thereof enters into a particle layer of said powder grains. Due to this, since gas is introduced into particle layers and the granulated substances come to a fluidized state, drying thereof is performed more efficiently.

Then, said rotating disk may have such a vertical section that a peripheral part thereof faces a center thereof and is inclined downward, and may have a projecting portion in a central part thereof. Further, gas may be supplied to said clearance formed between said fixed wall and said rotating disk, from a lower direction thereof to an upper direction. This gas may be ordinary air, but may use air properly performed by dehumidifying, heating or the like.

In addition, said fixed wall may have a dewing prevention means for preventing an inner surface of said fixed wall from being dewed. Due to this, first, similarly to the above-mentioned case, dry air can be supplied from above the rotating disk through the air supply means, and the granulated substances is dried in the same apparatus by this dry air. Therefore, it is unnecessary to transfer the granulated substances to other drying devices and then to perform drying processing, and thereby improvement of the productivity thereof can be achieved.

And, secondly, said dewing prevention means can prevent an inner surface of the rotating disk from being dewed, and adhesion of the powder grains to the inner surface of the fixed wall is suppressed, and cleaning jobs are alleviated, and at the same time the product yield and apparatus operation efficiency are improved, and so improvement of the production efficiency or the like can be achieved.

In this case, said dewing prevention means may comprise an outer wall surrounding said fixed wall, and an adiabatic space formed between said fixed wall and said outer wall. As a result, conduction of heat is cut off in the adiabatic space, and the fixed wall is not affected by the outside air temperature, and the fixed wall can prevent the inner surface thereof from being dewed even if the fixed wall is cooled by the air.

And, said dewing prevention means may further comprise a pump device for sucking air from the inside of said adiabatic space. In addition, said adiabatic space may be filled with gas having lower pressure than atmospheric pressure. At this time, it is preferable that the gas in said adiabatic space has a pressure of 1.33 Pa or less. Due to this, since the outer circumference of the fixed wall may be surrounded with an adiabatic space which is in a vacuum state, a cutoff action of heat conduction is further strengthened and improvement of the dewing prevention effect can be achieved.

In addition, the powder contact portion of said rotating disk may be formed to have a smooth surface. And, a slip prevention means for preventing the powder grains on said powder contact portion from slipping may be provided in the powder contact portion of said rotating disk. Due to this, the powder grains are prevented from slipping on the rotating disk, and at the same time centrifugal gripping force is strengthened, and tumbling of the powder grains are activated. Therefore, the powder grains can be centrifugally tumbled and granulated certainly, and high speed rotation of the rotating disk, tight granules, improvement of processing capacity of small quantity, and the like may be achieved.

The rotating disk that should provide a slip prevention means of the present invention may be a flat plate or a inclined plate as shown in FIG. 21.

And, in this case, said slip prevention means may be a strip-like groove radially formed in the powder contact portion of said rotating disk, and said strip-like groove may be formed such that a side wall of a front side along a rotating direction of said rotating disk is smoother than that of a rear side along said rotating direction.

In addition, said air supply means may be provided with a swirl flow generating means for supplying swirl wind onto said rotating disk. Due to this, since a swirl movement can be given to the powder grains located on the rotating disk, the powder grains are wound up in a spiral rotation shape so as to twist a rope. Therefore, tumbling of the powder grains can be promoted, and improvement of processing efficiency can be achieved. Further, the air stream is prevented from blowing through straightly, and contact time between the air stream and the respective powder grains can be lengthened, and so stay time of the air stream staying in powder grain layer is lengthened, and drying efficiency can be enhanced.

And, said swirl flow generating means may be a wind introducing plate arranged in said air supply means. In addition, said air supply means may be disposed in such a state as to incline toward a rotating direction of said rotating disk from above said rotating disk, and supplies a swirl air stream onto said rotating disk. As a result, similarly to the above-mentioned case, the swirl air stream promotes the stumbling of powder grains, and can lengthen the contact time between the air stream and the respective powder grains.

On the other hand, a powder grain processing method that is the present invention and that uses a centrifugal tumbling and granulating apparatus described above is characterized by the steps of: charging the powder grains into said centrifugal tumbling and granulating apparatus; rotating said rotating disk while gas is supplied to an upper direction of said. clearance from a lower direction thereof; and supplying at least one of solvent, solution, dispersion solution, and. dissolved solution, and then performing one of granulation and coating of said powder grains.

In this case, gas may be supplied from said air supply means to dry granulated substances of said powder grains, and a swirl air stream may be supplied from said air supply means. Moreover, powders may be further supplied into said centrifugal tumbling and granulating apparatus.

In addition, said air supply means may be movably disposed between a lower position close to said rotating disk and an upper position remoter than said lower position from said rotating disk, and a drying step is performed, with said air supply means being disposed at said lower position.

Further, the granulating step or the coating step may be performed, with said air supply means being disposed at said upper position, and the granulating step or the coating step may be performed, with said air supply means being disposed at said lower position close to said rotating disk.

In the above-mentioned granulating step or coating step, granulation processing or the coating processing may be performed while gas is supplied from said air supply means, or these processing may be performed after gas stops to be supplied. The gas to be supplied may have a normal temperature or be heated.

In said drying step, it is preferred to perform drying processing while gas is supplied from said air supply means, and it is further desired that gas is heated. However, in the case of supplying dissolved substances and performing the granulation processing and the coating processing and the like, there is also the case of not heating supplied gas.

BEST MODE FOR CARRYING OUT THE INVENTION

With reference to the drawings, embodiments of the present invention will be described in detail below.

First Embodiment

Figure 1:
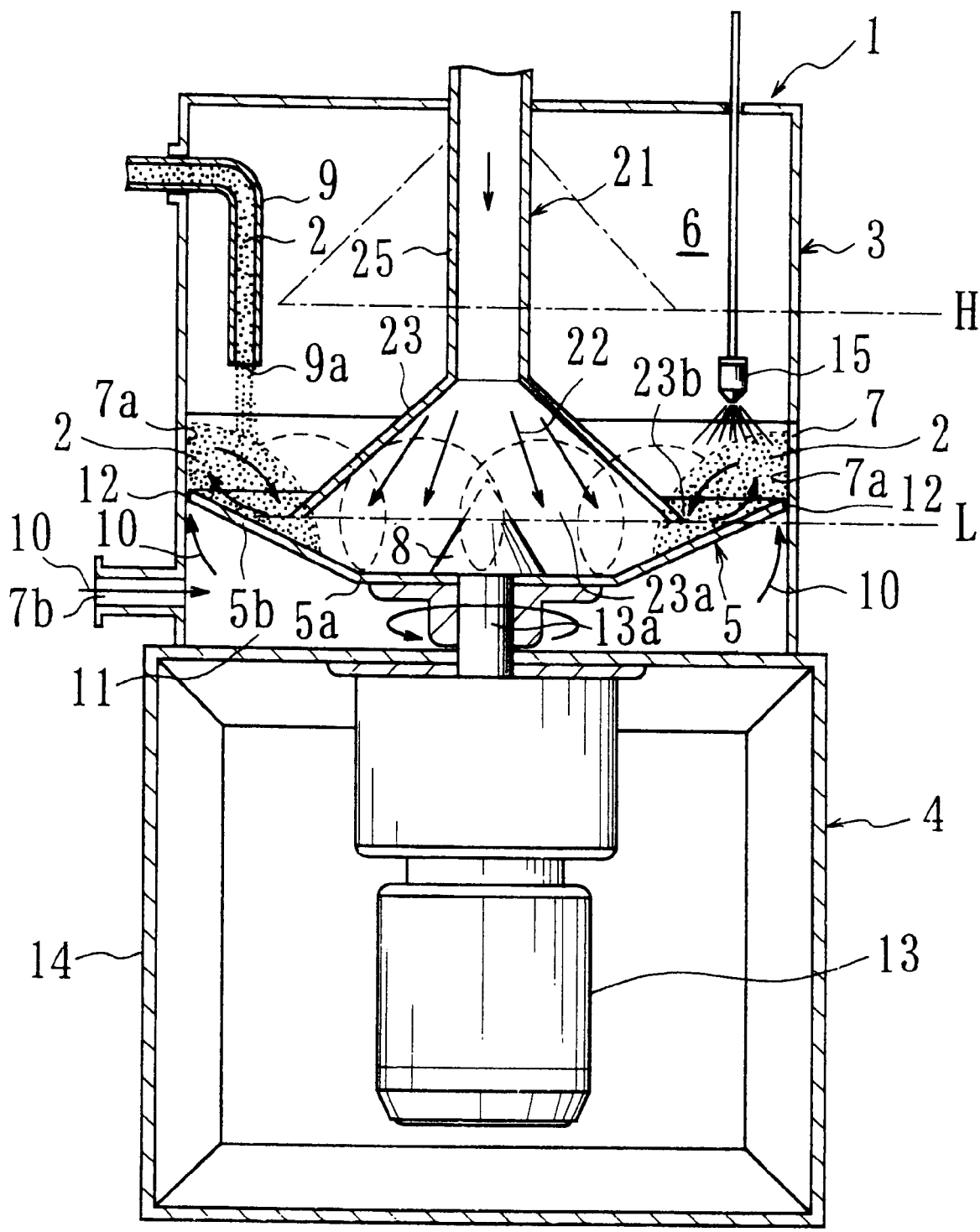
FIG. 1 is a cross-sectional view showing a constitution of a centrifugal tumbling granulating coating apparatus that is a first embodiment of the present invention.

FIG. 1 is a cross-sectional view showing a constitution of a centrifugal tumbling granulating coating apparatus that is a first embodiment of the present invention.

As shown in FIG. 1, a centrifugal tumbling granulating coating apparatus (called a CF apparatus hereinafter) 1 according to the present embodiment is one for centrifugally tumbling and granulating powder grains 2 and for forming a coating layer. This CF apparatus 1 performs processings of adding binding liquid or powder to the powder grains 2 at a predetermined speed, and of granulating spherical granules or the like by using each of the powder grains as a kernel or by bonding the powder grains with one another. Further, this CF apparatus 1 can also form coating layers on grains or the like by adding powder or binding liquid to the spherical granules or the like during the centrifugal tumbling thereof.

This CF apparatus 1 is composed of a centrifugal tumbling unit 3 positioned in the upper part of the apparatus, and a rotary driving unit 4 positioned in the lower part thereof. In the centrifugal tumbling unit 3, a centrifugal tumbling chamber 6 for centrifugally tumbling the powder grains 2 thrown thereinto and for performing a granulating and coating processing. The centrifugal tumbling chamber 6 is composed of a cylindrical fixed wall 7 served as a housing of the CF apparatus 1, and a rotating disk (or a rotating disc or a rotating dish) 5 centrifugally tumbling the powder grains 2 and served as a substantial bottom portion of the centrifugal tumbling chamber 6 for centrifugally tumbling the powder grains 2. The upper part of the centrifugal tumbling chamber 6 may be open, but portions other than portions required for communicating with the outside may be closed.

The fixed wall 7 has a powder contact portion 7a which is in contact with the powder grains 2 and which has a circular shape in a horizontal section thereof, and a predetermined clearance 12 is formed between the rotating disk 5 and an inner wall of the fixed wall 7. Herein, a reason why the horizontal section of the powder contact portion 7a is a circular shape is that movement of the respective powder grains to be centrifugally tumbled becomes smooth and a dead space is not formed. Therefore, the fixed wall 7 assumes the form of having a similar circular horizontal section along the overall height of the centrifugal tumbling unit 3, but each sectional shape of portions other than the powder contact portion 7a is not limited to a circular shape. That is, the sectional shape of the fixed wall 7 may be a conical, spherical or quadrangular shape, and even if a part thereof is composed of the powder contact portion 7a having a circular section, the entire shape thereof is not limited to a cylindrical shape.

Materials for forming the fixed wall 7 are not restricted in particular, but various raw materials such as stainless steel, iron, light alloy, reinforced plastics or the like may be used as the above-mentioned materials. Lining formed of non-adhesive resin such as fluororesin, polyether or the like may be provided on a part or the entire of the powder contact portion 7a. Further, lining formed of non-adhesive resin may also be provided on a central part 5a or slope part 5b of the rotating disk 5 mentioned below. This lining prevents granulated substances or coating processing substances from adhering to the powder contact portion 7a or the rotating disk 5.

Figure 2:
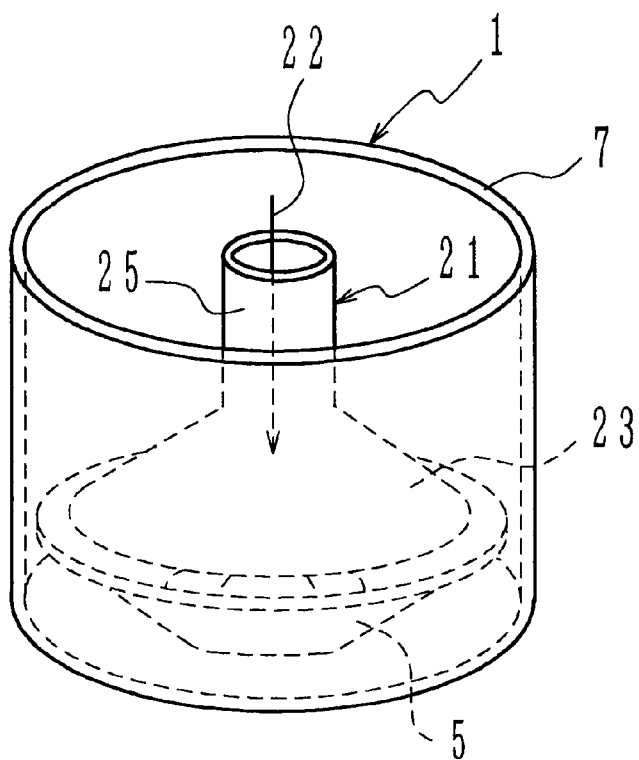
FIG. 2 is an explanatory view showing a disposing state of an air supply device applied to the granulating coating apparatus in FIG. 1.

An air supply device (an air supply means) 21 is provided above the central part of the rotating disk 5 in the centrifugal tumbling chamber 6. FIG. 2 is an explanatory view showing a disposing state of the air supply device 21, and shows a state seen from an upper portion of the air supply device 21 after a ceiling portion of the centrifugal tumbling chamber 6 is omitted. This air supply device 21 is composed of a straight tube portion 25 formed in a straight cylinder shape, and an umbrella-like air supply port 23 disposed in a lower side of the straight tube portion 25. The straight tube portion 25 and the air supply port 23 communicate with each other inside, and the straight tube portion 25 is connected to a not shown air-sending means such as a blower or the like provided outside of the CF apparatus 1.

The air supply device 21 is fitted in such a state as to be capable of moving in the centrifugal tumbling chamber 6 in an up-and-down direction by a driving means not shown. Further, the air supply device can move between an upper position H indicated by a single dot chain line in FIG. 1 and a lower position L indicated by a solid line. However, needles to say, the air supply device 21 may be disposed to have a fixed structure.

The conical air supply port 23 of which the lower side is expanded in a radius direction is provided at a lower end of the straight tube portion 25. This air supply port 23 is designed to cover the rotating disk 5 with a lower end portion thereof like an umbrella when the air supply device 21 is lowered at the lower position L. From an opening portion 23a of this air supply port 23, dry air 22 can be widely supplied to an upper side of the rotating disk 5. The dry air 22 is ejected from a gap between a lower end peripheral edge 23b of the air supply port 23 and the rotating disk 5. As a result, the granulated substances are fluidized in the centrifugal stumbling chamber 6, and drying thereof is promoted. That is, in the above-mentioned CF apparatus 1, it is possible to dry the granulated substances generated by this dry air 22, and to perform from a granulation processing to a drying processing in a single apparatus.

Further, a feed pipe 9 for feeding the powder grains 2 to the rotating disk 5 is provided from above the centrifugal tumbling chamber 6, with a throw-in port 9a being opposite to the rotating disk 5. A spray nozzle 15 is also provided to spray the powder grains 2 with the binding liquid or powders stored in a tank not shown. In this case, a nozzle having a two-fluid or three-fluid structure may be used as the spray nozzle 15. The spray nozzle 15 may be disposed above a powder grain layer as shown in the drawing, or disposed so as to spray on the powder grain layer from a side direction thereof, or disposed at such any other positions as to be capable of supplying the spray solution into the powder grains.

The rotating disk 5 is composed of a central part 5a which is formed in a plane shape and positioned in a central side thereof, and a slope part 5b inclined straightly and downward toward the center thereof at the outside of this central part 5a. In the above-mentioned CF apparatus 1, a vertical section of the rotating disk 5 is defined to have such a relation that a dimension (P) of the rotating disk 5 in a horizontal direction satisfies $P \geq 0.25 D$ relative to the diameter (D) of the rotating disk 5 (preferably $0.4D \geq P \geq 0.25D$). A height (H) from the central part 5a to the slope portion 5b is within a range of $0.1D \leq H \leq 0.33D$ relative to the diameter (D) (preferably $0.1D \leq H \leq 0.25D$). Hence, in the above-mentioned CF apparatus 1, the centrifugal force created by the rotating disk 5 is utilized effectively and sufficiently, and the powder grains 2 are centrifugally tumbled effectively on the slope portion 5b.

A conical projecting portion 8 is formed at the center of the central part 5a of the rotating disk 5, and thereby distortion of the rotating disk 5 is prevented and strength thereof is ensured. Further, by this projecting portion 8, the powder grains 2 near the center of the rotating disk 5 is aggressively moved to the slope portion 5b on which a centrifugally tumbling action is carried out.

Of an inner wall of the fixed wall 7, a portion with which the powder grains 2 are in contact during the centrifugal tumble, that is, the powder contact portion 7a is substantially formed in a perpendicular state relative to the central part 5a of the rotating disk 5. Therefore, the powder grains 2 which are centrifugally tumbled on the rotating disk 5 are upward pushed along the powder contact portion 7a, without receiving any extra resistance.

In a lower side of the fixed wall 7, an air supply port 7b is opened to take slit air 10 circulating through the clearance 12 between the rotating disk 5 and the fixed wall 7, in a fluid chamber 11 formed in the lower side of the rotating disk 5. Air taken therein is the slit air 10 passing through the annular clearance 12 from the fluid chamber 11, and is introduced into the centrifugal tumbling chamber 6. In this case, the above-mentioned clearance 12 is formed with such a width that the powder grains 2 in the centrifugal tumbling chamber 6 may not drop out from the clearance when the slit air 10 is supplied from beneath. Therefore, since the slit air 10 is circulated through the clearance 12, the powder grains 2 are prevented from falling from the clearance 12 and when the powder grains 2 are charged into the centrifugal tumbling chamber 6, these powder grains 2 are entirely supported by the rotating disk 5.

Figure 3:
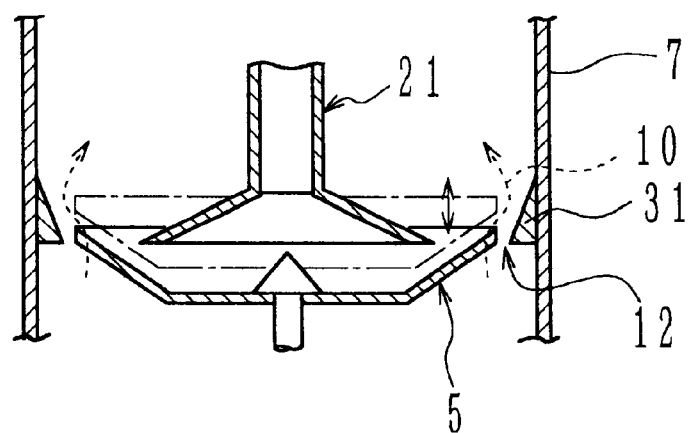
FIG. 3 is an explanatory view showing a constitution in which clearance between a fixed wall and a rotating disk is variably formed in the granulating coating apparatus of FIG. 1.

As shown in FIG. 3, flow amount of slit air 10 may be adjusted by forming a taper-like convex portion 31 inside the fixed wall 7, and by installing the rotating disk 5 capable of moving in an up-and-down direction, and thereby varying width of the clearance 12.

On the other hand, in the rotary driving unit 4, a motor (a rotary driving means) 13 that rotates the rotating disk 5 and is accommodated in a casing 14 is provided. A shaft 13a of this motor 13 is fixed on a rotational center axis of the rotating disk 5, and thereby the rotating disk 5 may be rotated in a horizontal direction.

Next, operation of the present embodiment will be explained. The above-mentioned CF apparatus 1 performs a granulation processing, with the air supply device 21 being lifted to the upper position H. After a granulating step, the CF apparatus makes the air supply device 21 pulled down to the lower position L, and subsequently performs a drying processing.

First, in the granulating step, with the air supply device 21 being disposed at the upper position H, air supply is stopped, and predetermined amounts of powder grains 2 which are processing materials to be processed on the rotating disk 5 in the centrifugal rotating chamber 6 are thrown in from the throw-in port 9a of the feed pipe 9. At this time, powder grains-used as materials may be powders, or may be powders served as kernels. A granulating condition may be imposed such that a granulation or coating processing is performed during air supply from the air supply device 21, with the air supply device 21 being disposed at the lower position L.

Further, while the slit air 10 from the clearance 12 is circulated, the rotating disk 5 is rotated by the motor 13 and the powder grains 2 are centrifugally tumbled on the rotating disk 5. In this case, the rotating disk 5 has any rotating speed, but usually a rotating speed of about 30 to 300 rpm.

Moreover, in order to make powders adhering to each other or make powders adhering to respective surfaces of kernel particles, the inside of the centrifugal tumbling chamber 6 is sprayed with a solution obtained by dissolution of a solvent or binding liquid, a dispersion solution such as emulsion or suspension, or a fused solution according to circumstances, from the spray nozzle 15. Only one of these solvent and solution may be used in accordance with properties of the powder grains or with granulated substances desired, or the other to which one is changed may be used in accordance with processing steps of granulation. In the case of using the solution, substances having the same elements as the powder grains are usually used, but other substances having elements different from elements that the powder grains contain may be also used. Further, as occasion demands, powders may be fed during the granulating step.

Thus, the powder grains 2 are centrifugally tumbled on the rotating disk 5 in the centrifugal tumbling chamber 6, and binding liquid or powders is supplied to the powder grains 2 which have been centrifugally tumbled on the rotating disk. Accordingly, the powder grains 2 are centrifugally tumbled and thereby are spherically granulated.

Spherical particles subsequent to the spherical granulation described above, or separately manufactured spherical particles may be charged into the apparatus according to the present invention, and the particles may be coated with a medicine or an elution control layer. In addition to spherical particles, respective surfaces of amorphous particles or powders may be also coated with a medicine or an elution control layer.

When granulated particles each reach a desired particle size, supply of solvent or solution is stopped and the granulation processing is terminated. At this time, since the above-mentioned apparatus 1 adopts much the same granulation processing as the conventional single-function type CF apparatus, it is possible to granulate spherical particles of which each particle size is small and which exist within a narrow range of the particle size distribution. Needless to say, large spherical particles can be also manufactured. Further, operating conditions may be imposed such that amorphous particles, or oblate particles having no spherical form such as an ellipse shape, a "go" stone shape or the like but having a certain pseudo-spherical form, or a coagulation-like particles are manufactured in addition to spherical particles.

After this granulating step, the drying processing of granulated substances is performed. In the conventional CF apparatus, because the drying capacity of the apparatus is poor, the drying processing is performed by transferring the granulated substances to other devices. In contrast, the above-mentioned CF apparatus 1 can granulate the granulated substances having the same properties of spherical form and the same particle sizes as the conventional apparatus, and can further perform the drying processing inside the same apparatus.

That is, after the granulating step, air supply is started from the air supply device 21 having lifted to the upper position H in advance, and the air supply device is gradually moved to the lower position L. Dry air 22 from the air supply device 21 is introduced into a granulated substance layer located on the rotating disk 5, and thereby a fluid state is formed. As a result, the granulated substances are quickly dried by the dry air 22, and thereby products containing desired spherical particles can be efficiently manufactured. At this time, by enlarging the above-mentioned clearance 12 and increasing flow amounts of slit air 10, enhancement of the drying capacity thereof can be further achieved.

During the drying step, the rotating disk 5 may be in a rotating or stopped state. The height of the lower position L of the air supply device 21 is not particularly restricted, but it is preferable that at least one part of the air supply device 21 enters into a laminating layer of the granulated substances, and that the granulated substances are fluidized or moved in an up-and-down direction like a nearly fluid state by the dry air 22. That is, even in the above-mentioned CF apparatus 1, it is desired to dispose the air supply device 21 at such a position that an edge of the opening portion 23a of the air supply port 23 is buried in particle layers, and to thereby improve the drying capacity thereof.

As described above, the above-mentioned CF apparatus 1 according to the present invention can granulate heavy spherical particles of which respective particle sizes are small and which exist within a narrow range of the particle size distribution, similarly to the conventional single-function type CF apparatus, and further can perform the drying processing inside the same apparatus. Therefore, it is possible to manufacture products having properties obtained by using the single-function type CF apparatus, at productivity nearly equal to the productivity capable of being achieved by the multifunction type powder grain processing apparatus, and so to manufacture efficiently products which meet market needs.

In the above-mentioned apparatus, such various processing patterns are available as to perform "drying after granulation", or "drying after coating", or "both coating and drying (drying while coating) after coating", or "granulation and then coating and thereafter drying", or "both coating and drying after granulation", or the like. In the above-mentioned embodiment, the processing form of "drying after granulation", among the various processing patterns, means that the granulation processing is performed by disposing the air supply device 21 at the upper position H and thereafter the drying processing is performed at the lower position L. However, in this case, all the processings may be performed at the lower position L by performing both the granulation processing and the drying processing, with the air supply device 21 being disposed at the lower position L.

And, as mentioned above, in the above-mentioned apparatus, the coating processing is also performed, and the processing form of "drying after coating", among the various processing patterns, means that the coating processing of particles generated after the granulation processing or of particles separately charged may be performed by disposing the air supply device 21 at the upper position H, and thereafter the drying processing may be performed at the lower position L. Further, after the air supply device 21 is disposed at the lower position L from the first, the coating processing and the drying processing may be performed continuously ("drying after coating") or simultaneously ("both coating and drying").

Further, the above-mentioned apparatus can also perform a series of processings composed of "granulating and then coating and thereafter drying". At this time, at least the drying step is performed by disposing the air supply device 21 at the lower position L, but during the granulation processing and/or the coating processing, the air supply device 21 may be disposed either at the higher or lower position. That is, all processings from granulation to drying may be performed at the lower position L, or only the granulation processing may be performed at the upper position H.

In addition, even when the processing of "both coating and drying after granulating" is performed, the processing step of performing drying during at least coating is performed by disposing the air supply device 21 at the lower position L. However, during the granulation processing, the air supply device 21 may be disposed either at the higher or lower position.

Figure 4:
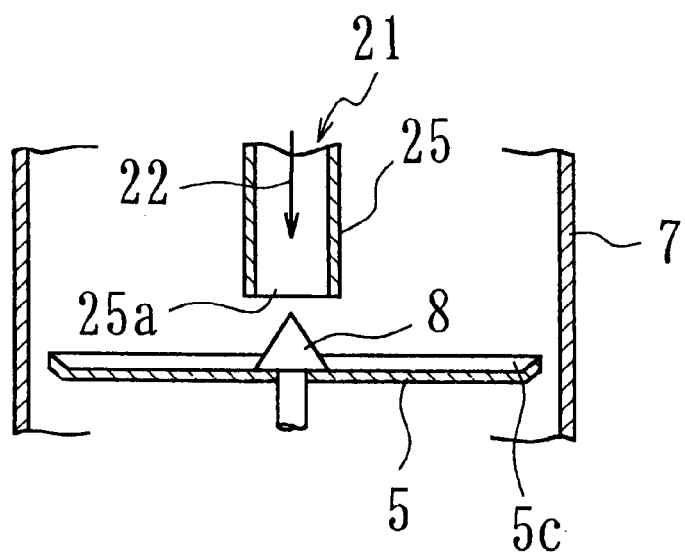
FIG. 4 shows a first modified example of the granulating coating apparatus that is a first embodiment.

On the other hand, the air supply device 21 is not limited to one shown in FIG. 1, and can adopt various forms thereof. FIGS. 4 to 10 show a first to seventh modified examples of the air supply device 21 designed to supply the dry air 22 from above the central part of the rotating disk 5, respectively. Drawings following FIG. 4 show only a principal part of the apparatus. Description of parts common to the parts shown in FIG. 1 will be omitted, and members and parts similar to the air supply device 21 shown in FIG. 1 are denoted by the same reference numbers and detailed description thereof will be omitted.

The apparatus shown in FIG. 4 has the air supply device 21 that is formed only by the straight tube portion 25 and is disposed in a center area of the centrifugal tumbling chamber 6 and has no umbrella-like air supply port 23. In this case, the opening portion 25a of the straight tube portion 25 is formed above the projecting portion 8. Further, the rotating disk 5 is also formed in such a plate shape as to raise an edge 5c from an outer periphery portion thereof.

Figure 5:
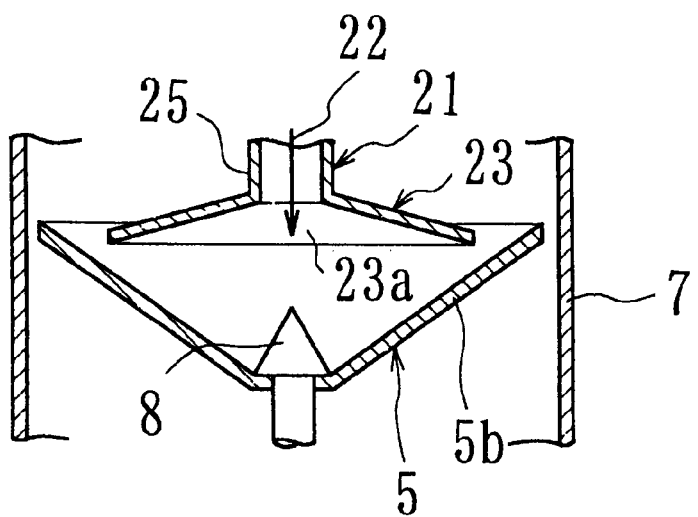
FIG. 5 shows a second modified example of the granulating coating apparatus in a first embodiment.

The apparatus shown in FIG. 5 uses a rotating disk, 5 having such a shape that the center part 5a of the rotating disk 5 shown in FIG. 1 is eliminated and the slope portion 5b is formed toward a base portion of the projecting portion 8 from the edge thereof. Further, the opening angle of the air supply port 23 of the air supply device 21 is also set to be larger than that of the air supply port shown in FIG. 1.

Figure 6:
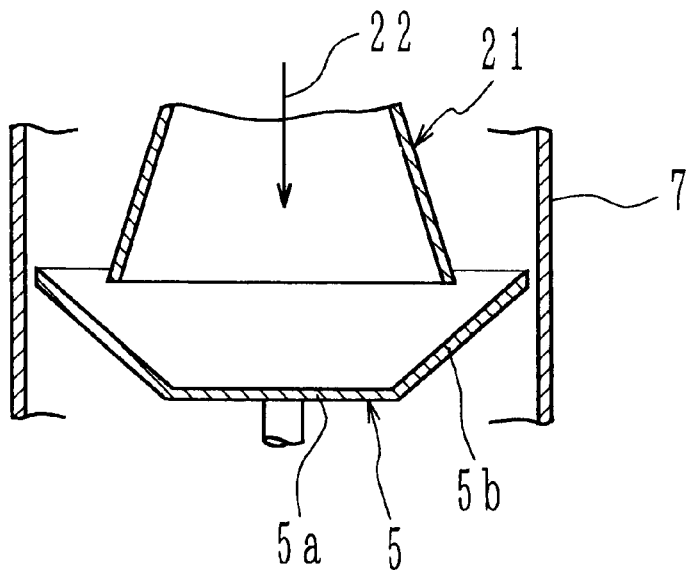
FIG. 6 shows a third modified example of the granulating coating apparatus in a third embodiment.

The apparatus shown in FIG. 6 uses the air supply device 23 formed by a taper-like cylindrical member of which an upper end portion is enlarged in a radius direction thereof.

Figure 7:
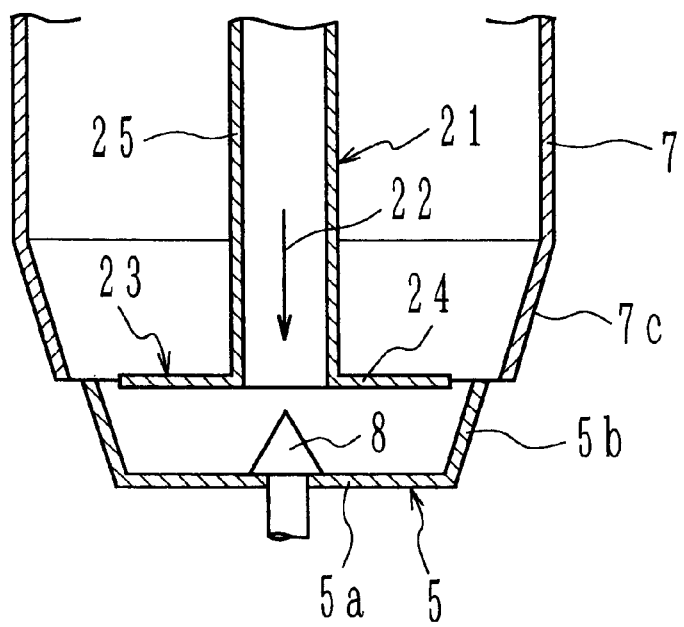
FIG. 7 shows a fourth modified example of the granulating coating apparatus in a first embodiment.

In the apparatus shown in FIG. 7, the fixed wall 7 of which foot is narrowed is used. The slope portion 5b of the rotating disk 5 is formed to have the same slanting angle as a foot narrowing portion 7c of the fixed wall. In this case, the air supply device 21 is used in which such a flange 24 as to cover nearly an upper surface of the rotating disk 5 is provided on the air supply port 23.

Figure 8:
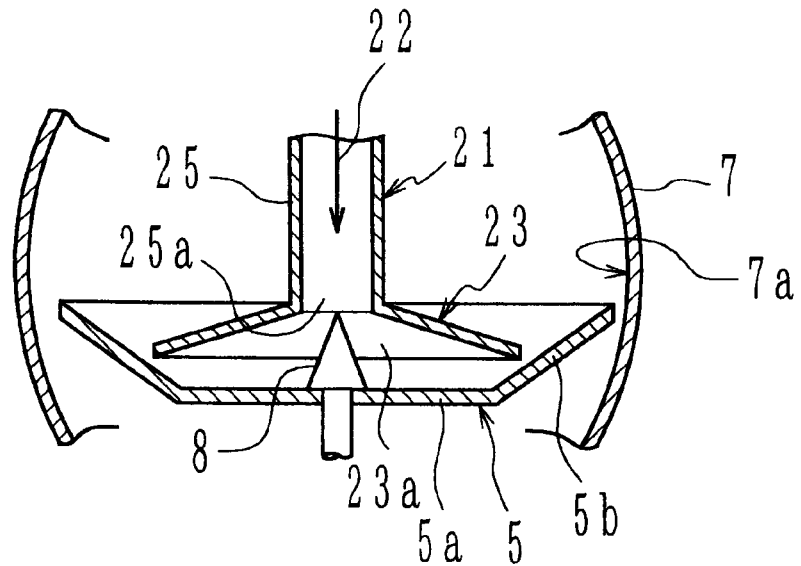
FIG. 8 shows a fifth modified example of the granulating coating apparatus in a first embodiment.

In the apparatus shown in FIG. 8, the fixed wall 7 is formed in a curved shape. In this case, a horizontal section of the powder contact portion 7a of the fixed wall 7 is formed in a circle shape as a section of sphere. The air supply device 21 is used which is the same as the device shown in FIG. 5. The rotating disk 5 is used which has the projecting portion formed in such a shape as to thin and sharpen the projecting portion 8 of the rotating disk 5 shown in FIG. 1, such that when the air supply device 21 is lowered to the lower position L, a tip of the projecting portion 8 arrives at a position of the opening portion 25a of the straight tube portion 25.

Figure 9:
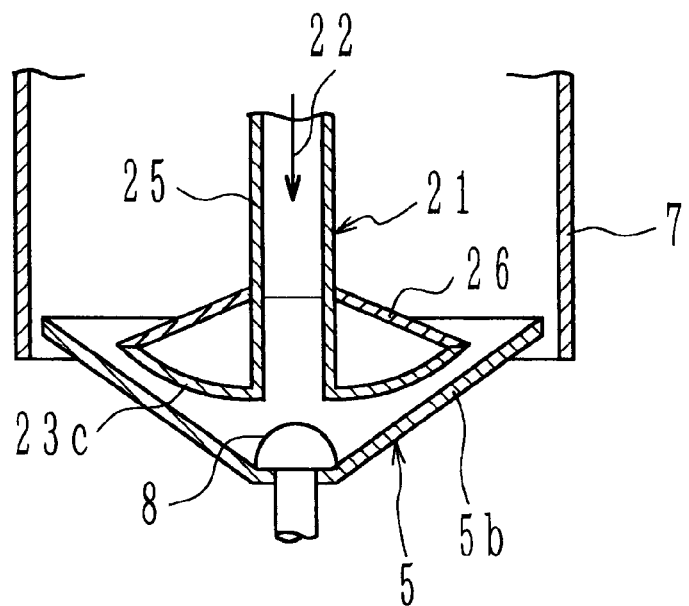
FIG. 9 shows a sixth modified example of the granulating coating apparatus in a first embodiment.

The apparatus shown in FIG. 9 has the rotating disk 5 of which the projection portion 8 is formed in a hemispheric shape and of which the slope portion 5b is curvedly raised from the base portion of the projecting portion 8 and thereafter is straightly formed. The air supply device 21 is used which has such a shape that a side wall 23c of the air supply port 23 is raised along the slope portion 5b of the rotating disk 5, contrary to the air supply device having been described so far. In this case, a cover 26 is provided between an upper edge of the side wall 23c and the straight tube portion 25 such that the granulated substances scattered are prevented from-staying the inside of the side wall 23c.

Figure 10:
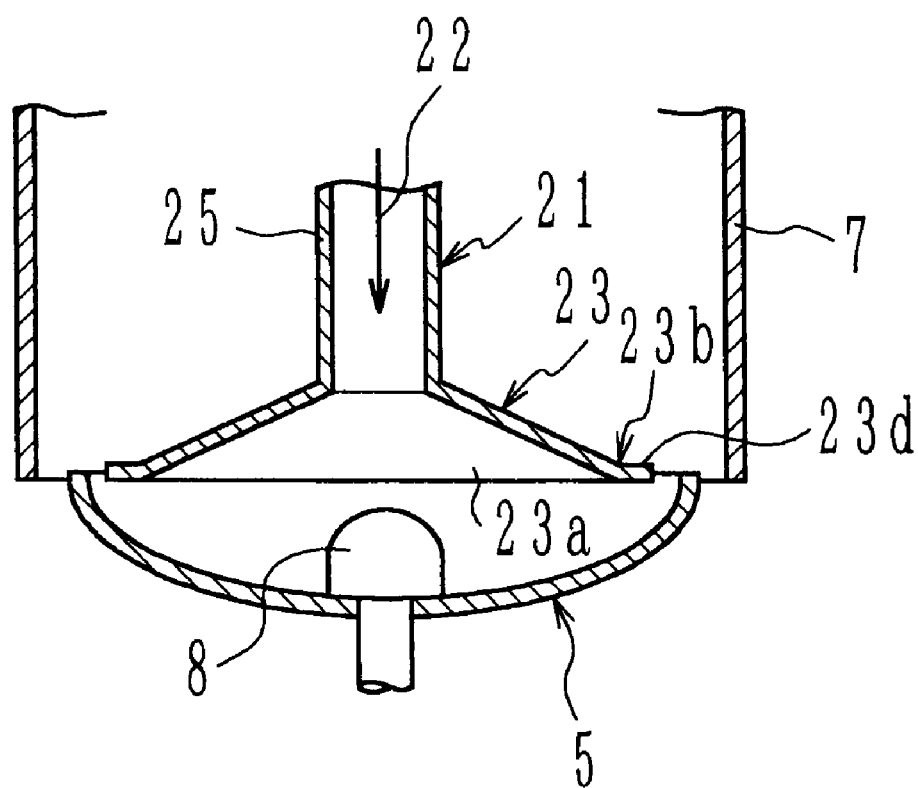
FIG. 10 shows a seventh modified example of the granulating coating apparatus in a first embodiment.

The apparatus shown in FIG. 10 is used which has the rotating disk 5 of which the projecting portion 8 is formed in an elliptical and hemispherical shape and of which the slope portion 5b is also formed like a curved surface. In this time, the air supply device 21 is used which has a flange 23d formed at the lower end peripheral edge 23b of the air supply port 23 shown in FIG. 1.

Second Embodiment

Figure 11A:
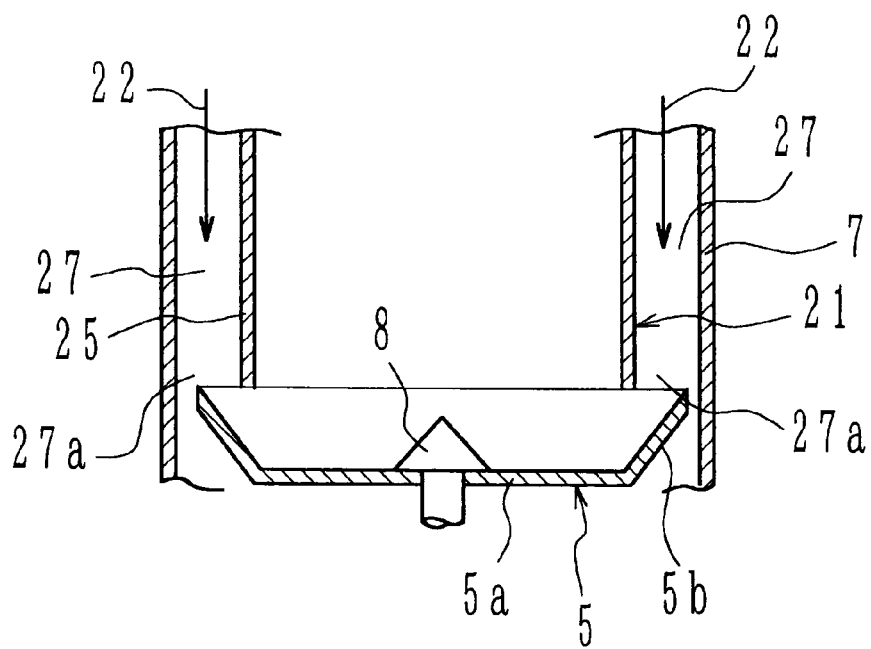
FIG. 11A is an explanatory view showing a constitution of a principal part of a centrifugal tumbling granulating coating apparatus that is a second embodiment of the present invention, and is a cross-sectional view.
Figure 11B:
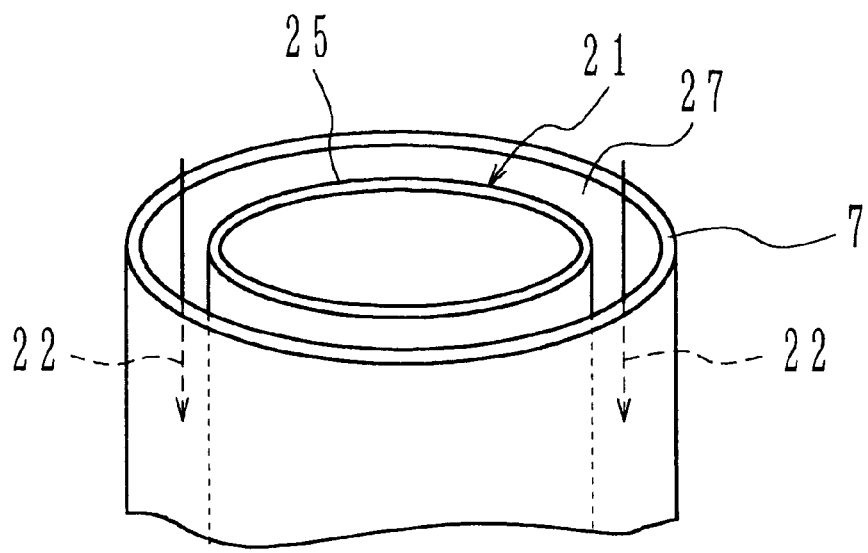
FIG. 11B is an explanatory view showing a constitution of a principal part of a centrifugal tumbling granulating coating apparatus that is a second embodiment of the present invention, and is a perspective view seen from above.

Next, as a second embodiment of the present invention, explanation will be made of a CF apparatus having a form of supplying the dry air 22 from above the peripheral part of the rotating disk 5 by means of the air supply device 21. FIG. 11A and FIG. 11B are explanatory views showing principal parts of a CF apparatus that is the second embodiment of the present invention, wherein FIG. 11A is a cross-sectional view and FIG. 11B is a perspective view seen from above.

In the apparatus shown in FIG. 11A and FIG. 11B, the air supply device 21 adopts a thick cylinder-like straight tube portion 25. A clearance 27 is formed between the straight tube portion 25 and an inner surface of the fixed wall 7, and the dry air 22 circulates through this clearance 27. As shown in FIG. 11A, an opening portion 27a of the clearance 27 is formed at the lower end of the straight tube portion 25. The dry air 22 is supplied toward the slope portion 5b positioned at the periphery part of the rotating disk 5, from above through this opening portion 27a. As a result, the dry air 22 is supplied to the granulated substances located on the rotating disk 5, and the drying processing of the granulated substances is performed. Even in this present embodiment, the air supply device 21 is disposed so as to be movable in an up-and-down direction.

Figure 12:
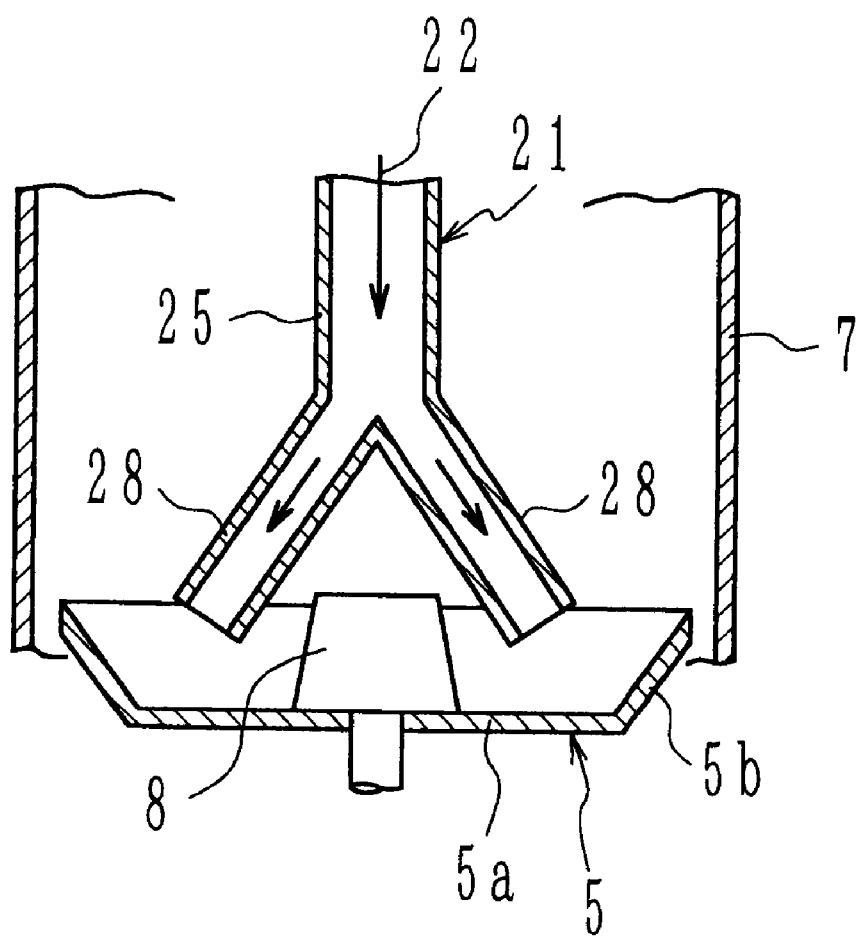
FIG. 12 shows a first modified example of the granulating coating apparatus in a second embodiment.

On the other hand, even in the case of supply of the dry air 22 from above the peripheral part of the rotating disk 5, various modified examples may be assumed. FIG. 12 and FIG. 13 show a first and second modified examples of the CF apparatus of the second embodiment, respectively.

In the apparatus shown in FIG. 12, the straight tube portion 25 of the air supply device 21 disposed in the center of the centrifugal tumbling chamber 6 is branched at the upper portion of the rotating disk 5, and each branch pipe 28 has a form of extending above the periphery of the rotating disk 5 and of having an opening. In this case, the number of branch pipes 28 shown in FIG. 12 is two, but the number thereof may be properly increased or decreased, for example, a part of the straight tube portion to be branched may be equally divided into four pipes.

Figure 13A:
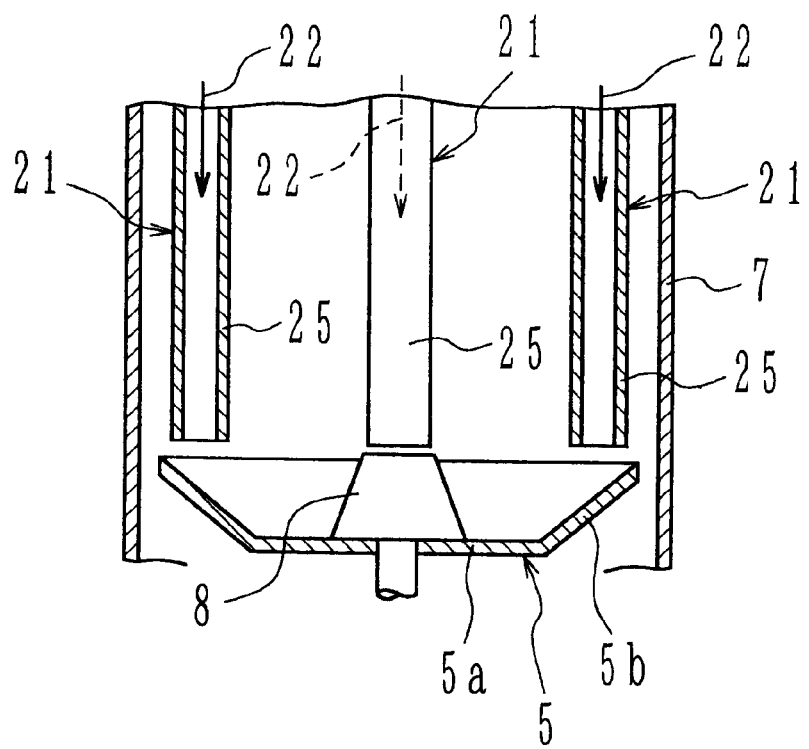
FIG. 13A shows a second modified example of the granulating coating apparatus in a second embodiment.
Figure 13B:
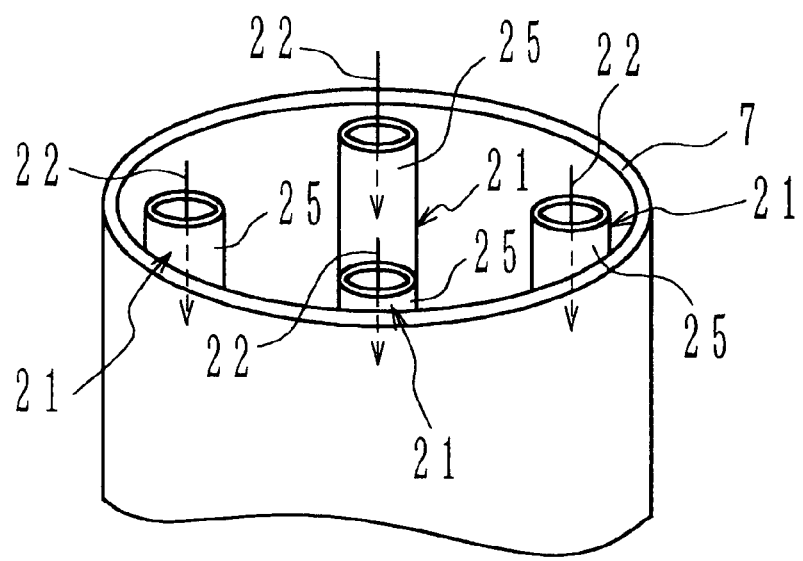
FIG. 13B shows a second modified example of the granulating coating apparatus in a second embodiment.

In the apparatus shown in FIG. 13A and FIG. 13B, a plurality of straight tube portions 25 of the air supply device 21 are arranged at the periphery part of the centrifugal tumbling chamber 6. In the apparatus shown in FIGS. 13A and 13B, as shown in FIG. 13B, four straight tube portions 25 are equally divided and provided, and the dry air 22 is supplied to the peripheral part of the rotating disk 5 from the respective opening portions disposed at lower ends thereof. In this case too, the number of straight tube portions 25 may be properly increased or decreased, for example, two, six or the like.

Third Embodiment

Figure 14:
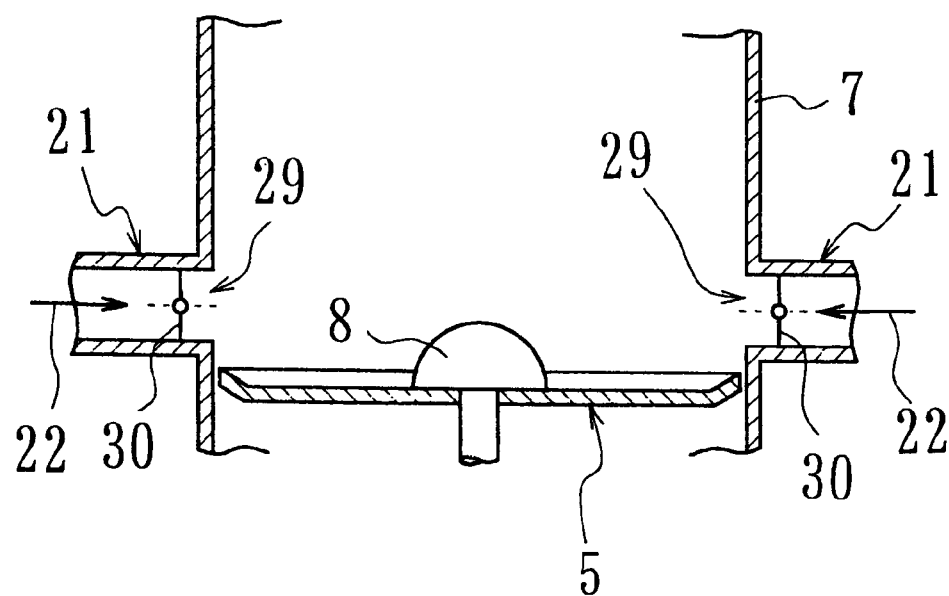
FIG. 14 is an explanatory view showing a constitution of a principal part of a centrifugal tumbling granulating coating apparatus that is a third embodiment of the present invention.

Further, as a third embodiment of the present invention, explanation will be made of the CF apparatus having a form of supplying the dry air 22 to the rotating disk 5 from a side direction of the centrifugal tumbling chamber 6. FIG. 14 is an explanatory view showing a principal part of the CF apparatus that is a third embodiment of the present invention.

In the apparatus shown in FIG. 14, the air supply device 21 is arranged at the fixed wall 7. The air supply device 21 is opened at an upper side portion of the rotating disk 5, and the dry air 22 is supplied upward the rotating disk 5 from the opened portions. In this case, opening-and-closing doors 30 are provided in opening portions 29 of the air supply device 21, and these opening-and-closing doors 30 are closed during the granulating step. In the drying step, the doors are opened, and thereby the dry air 22 is introduced into the centrifugal tumbling chamber 6.

Fourth Embodiment

Figure 15:
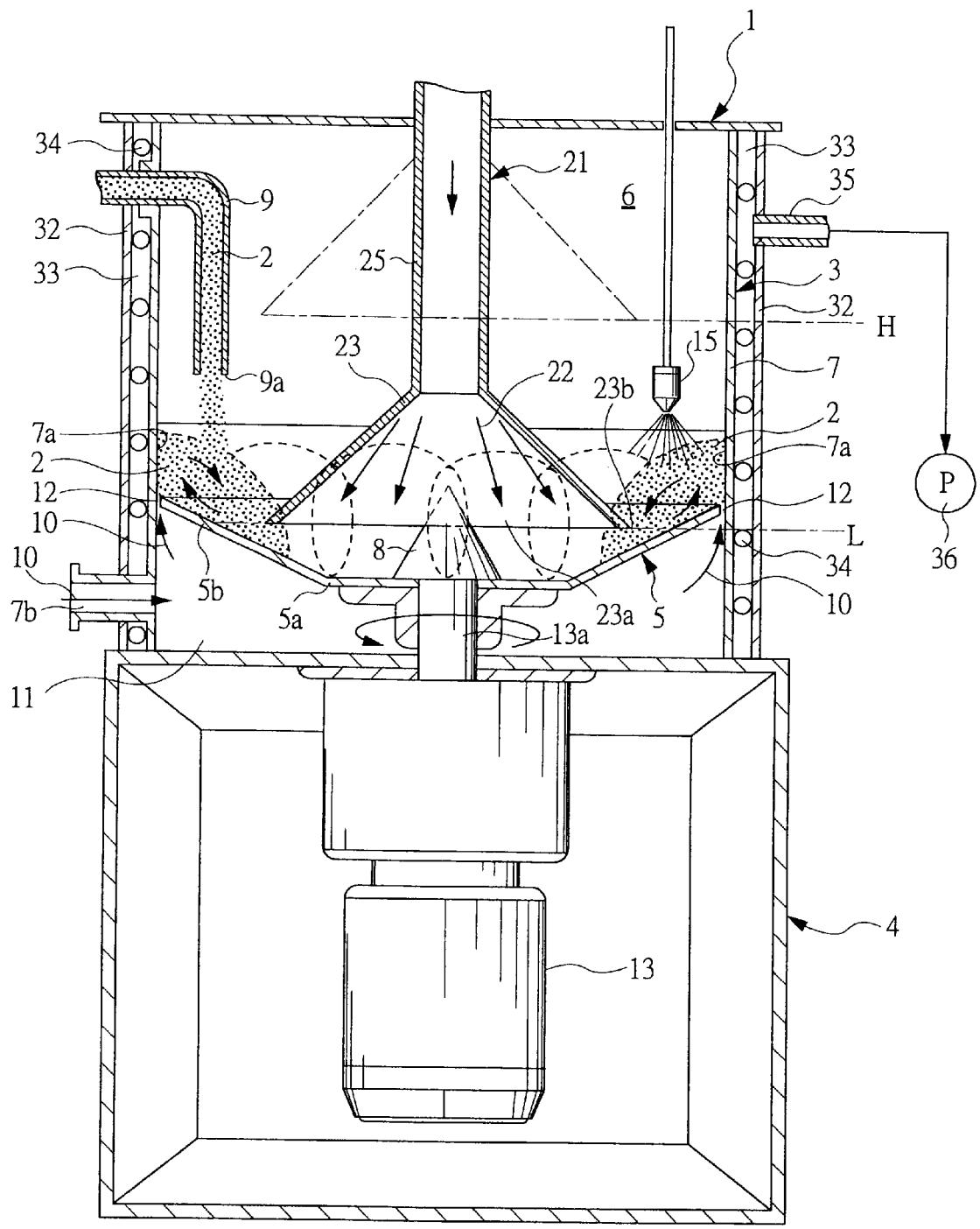
FIG. 15 is a cross-sectional view showing a constitution of a principal part of a centrifugal tumbling granulating coating apparatus that is a fourth embodiment of the present invention.
Figure 16:
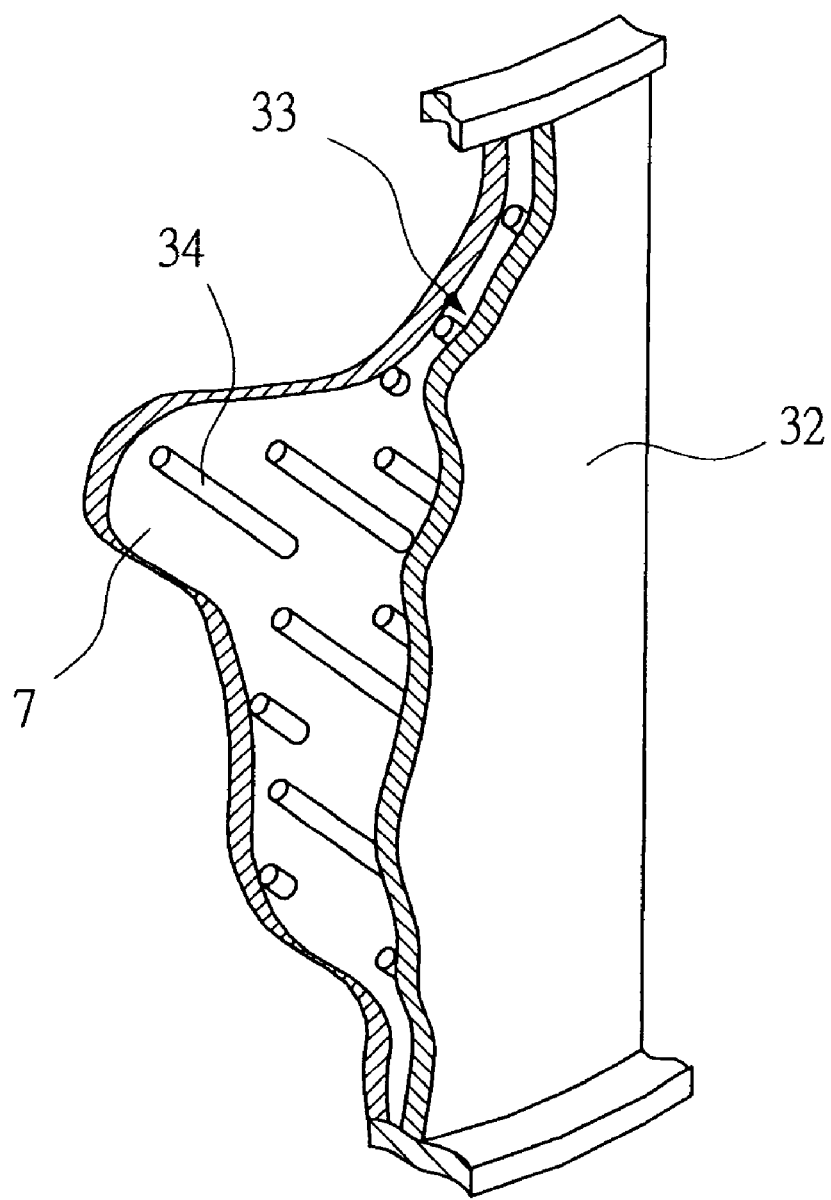
FIG. 16 is an explanatory view showing a fragment of a part of the CF apparatus in FIG. 15.
Figure 17:
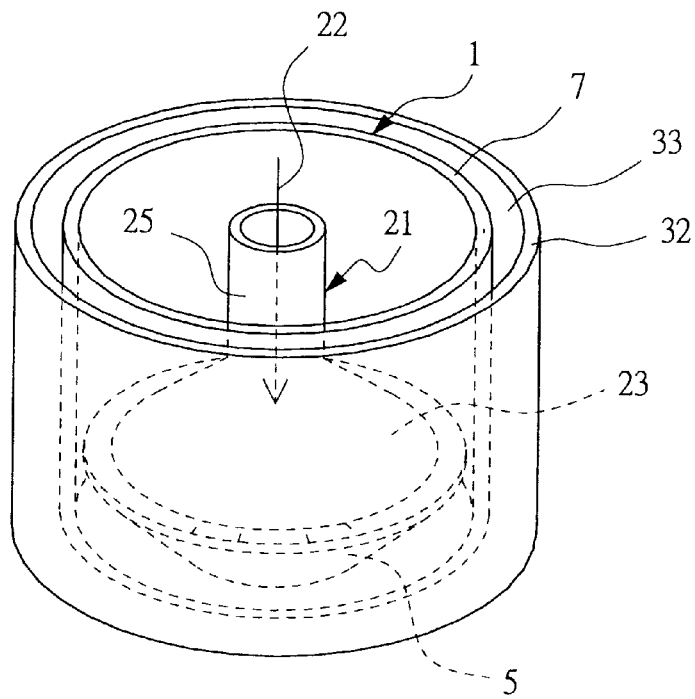
FIG. 17 is an explanatory view showing a disposing state of an air supply device in the CF apparatus of FIG. 15, and shows a view of the air supply device seen from above after a ceiling portion of a centrifugal tumbling chamber is omitted.

Next, as a fourth embodiment, explanation will be made of the apparatus that adds a dewing prevention means to the centrifugal tumbling device. FIG. 15 is an explanatory view showing a principal part of a CF apparatus that is a fourth embodiment of the present invention. FIG. 16 is an explanatory view showing a fragment of a part thereof. FIG. 17 is an explanatory view showing a disposing state of the air supply device 21, and shows a view of the air supply device 21 seen from above after a ceiling portion of a centrifugal tumbling chamber 6 is omitted.

Herein, like the apparatus shown in FIG. 1, in the apparatus of which the centrifugal tumbling chamber 6 is separated from the outside air only by the fixed wall 7 made of metal, the fixed wall is directly cooled by the outside air. Due to this, portions locally having a temperature of the dew point or less are generated on the inner surface of the fixed wall 7, and so moisture in the centrifugal tumbling chamber 6 is dewed in such portions. For example, in the case of an atmosphere in which the inside of the centrifugal tumbling chamber 6 has a temperature of 70° C. and a humidity of 60%, if the temperature is lowered to 58° C., the humidity is increased to 100%. Therefore, portions that have been cooled by the outside air and of which the temperature arrives at 58° C. or less C come to a dew point zone, and dewing is generated in this zone.

If dewing is generated, then splash of binder or powders may adhere to and be solved in the moisture thereof, and thereby the solved substances function as adhesive, and the powder grains adhere to the solved substances. And, the powder grains act as kernels, and further other powder grains adhere to the powder grains, and the other powder grains adhering to the powder grains spread over the entire area of the fixed wall. This not only requires time and labor for cleaning the apparatus but also affects product yield and operation efficiency of the apparatus, so that improvement thereof is being desired.

Thereupon, in the apparatus that is the fourth embodiment, as shown in FIG. 15 and FIG. 16, the centrifugal tumbling chamber 6 has a double wall structure, and a vacuum adiabatic chamber 33 is formed at the outside of the fixed wall 7, and thereby this structure prevents the fixed wall 7 from being affected by the external temperature. That is, since the fixed wall 7 is provided with the adiabatic chamber 33 as a dewing prevention means, the inside of the fixed wall 7 does not lower to a temperature of the dew point or less.

In the above-mentioned CF apparatus, first, an outer wall 32 is provided to surround the entire of the fixed wall 7. An adiabatic chamber (adiabatic space) 33 is airtightly formed between the fixed wall 7 and an outer wall 32. Also between the fixed wall 7 and the outer wall 32, stainless steel spacers 34 each having a diameter of about 1 to 2 mm are arranged so as to be in contact with both walls.

The outer wall 32 is further provided with an exhaust port 35 for exhausting air of the inside of the adiabatic chamber 33. The exhaust port 35 is connected to a vacuum pump (pump device) 36 provided outside of the apparatus. By operating the vacuum pump 36 and thereby sucking air of the inside of the adiabatic chamber 33, the inside of the adiabatic chamber 33 results in such a state as to be filled with gas having lower pressure than the atmospheric pressure. That is, the inside of the adiabatic chamber 33 comes to a vacuum state. At this time, the space inside the adiabatic chamber 33 is ensured even by the spacers 34 arranged between the fixed wall 7 and the outer wall 32.

The inside of the adiabatic chamber 33 is a medium vacuum state ($10^2$ to $10^{-1}$ Pa) or a high vacuum state ($10^{-1}$ to $10^{-5}$ Pa). However, by considering a rigidity of the apparatus and an adiabatic effect, the present embodiment adopts a vacuum of 13.3 Pa (0.1 Torr) or less, preferably 13.3 to 1.33 Pa (0.1 to 0.01 Torr) from relation between cost and effect thereof.

Thus, if the adiabatic chamber 33 is set to be in a vacuum state, conducting heat is cut off at both inside and outside of the apparatus. That is, even if there is temperature difference between the inside of the centrifugal tumbling chamber 6 and the outside of the apparatus, the fixed wall 7 is not cooled directly by the outside air temperature. Due to this, even if the inside of the centrifugal tumbling chamber 6 comes to high temperature and high humidity, then the fixed wall 7 is cooled by the outside air and thereby dewing cannot be generated on the inner surface thereof. Therefore, the powder grains do not adhere to the inner surface of the fixed wall 7, and cleaning jobs are alleviated, and improvement of production efficiency or the like can be achieved.

In the above-mentioned embodiment, the adiabatic chamber 33 is set to be in a vacuum state and dewing of the fixed wall 7 is prevented, but the temperature of the fixed wall 7 may be prevented from lowering by supplying warm water, heated oil or the like into the adiabatic chamber 33. Or, the fixed wall 7 may be heated electrically or inductively in itself, without adopting the double wall structure.

Figure 18:
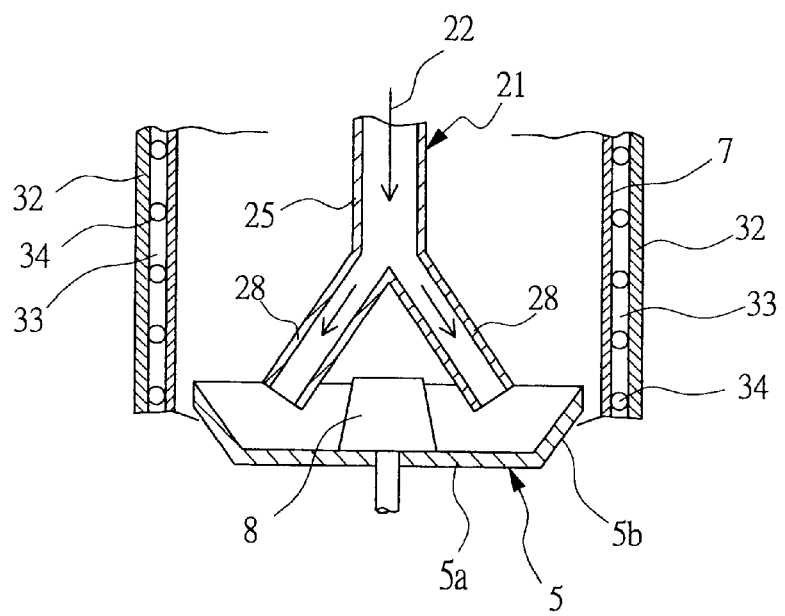
FIG. 18 is an explanatory view of a modified example of an air supply device.
Figure 19A:
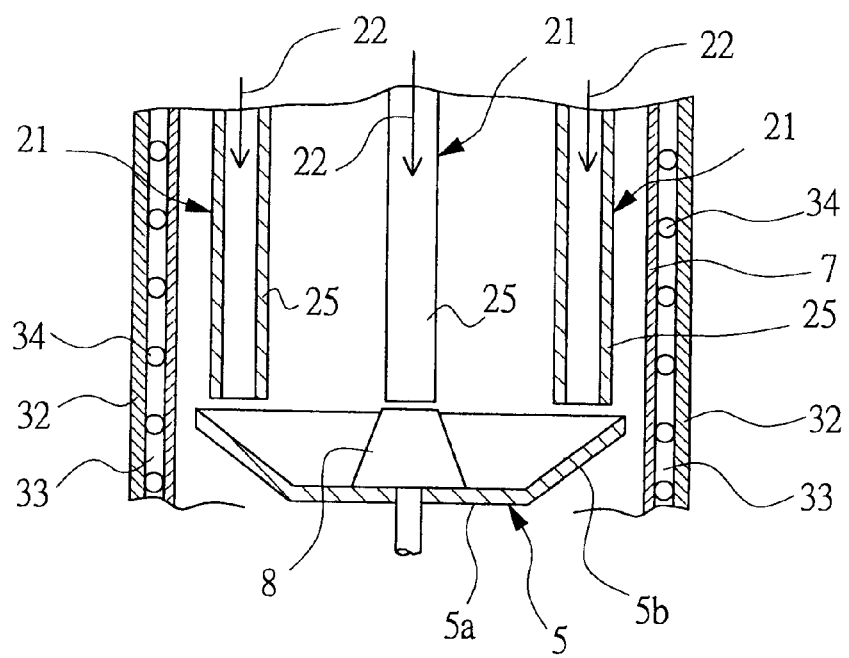
FIG. 19A is an explanatory view of a modified example of an air supply device, and is a cross-sectional view.
Figure 19B:
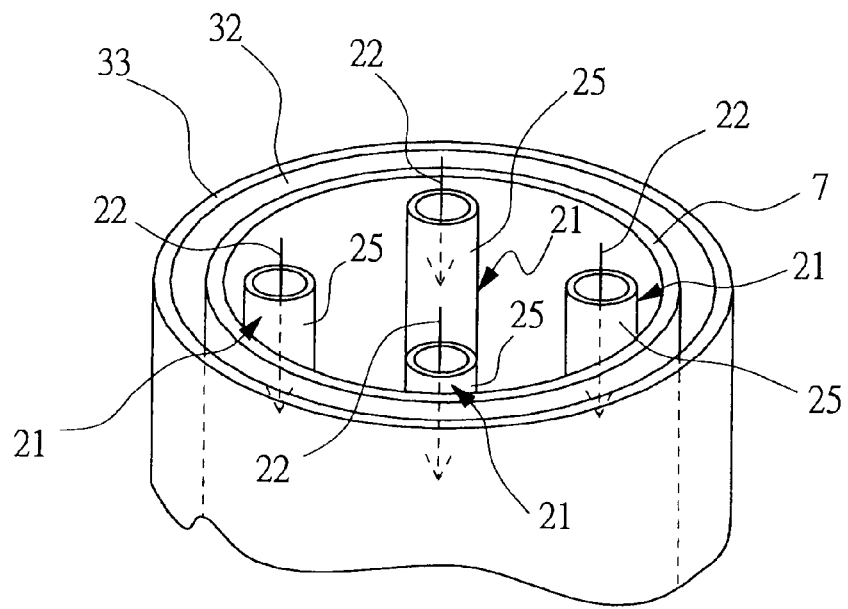
FIG. 19B is an explanatory view of a modified example of an air supply device, and is a view of the air supply device seen from above after a ceiling portion of a centrifugal tumbling chamber is omitted.

Moreover, as the apparatus shown in FIG. 18 and FIG. 19, the dry air 22 may be supplied from above the peripheral part of the rotating disk 5 in order to correspond to the apparatuses shown in FIG. 12 and FIG. 13.

Fifth Embodiment

Figure 20:
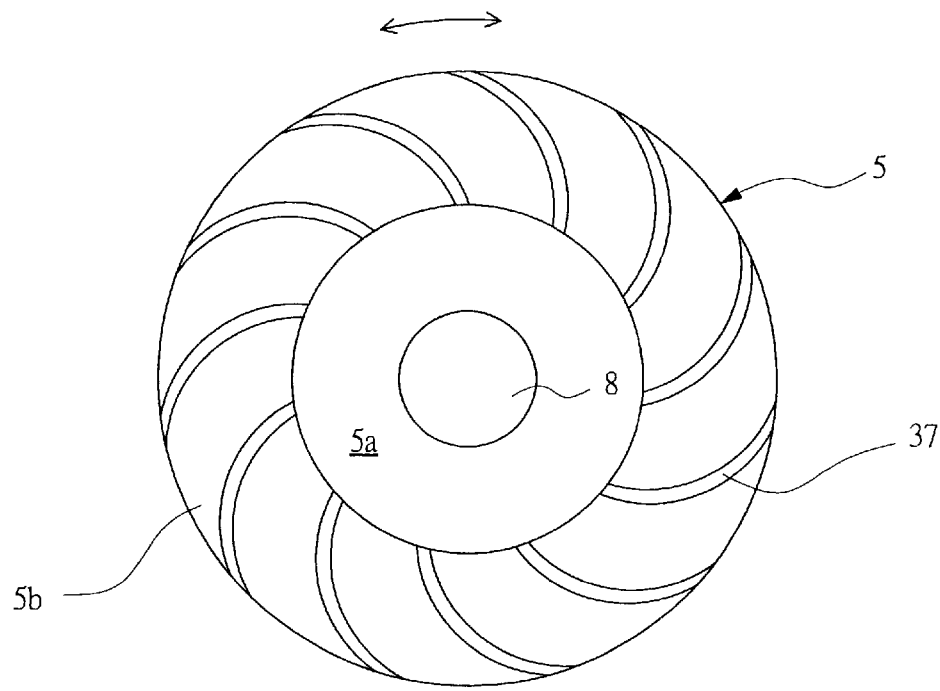
FIG. 20 is an explanatory view showing a constitution of a rotating disk that is a fifth embodiment of the present invention and which is seen from above.
Figure 21:
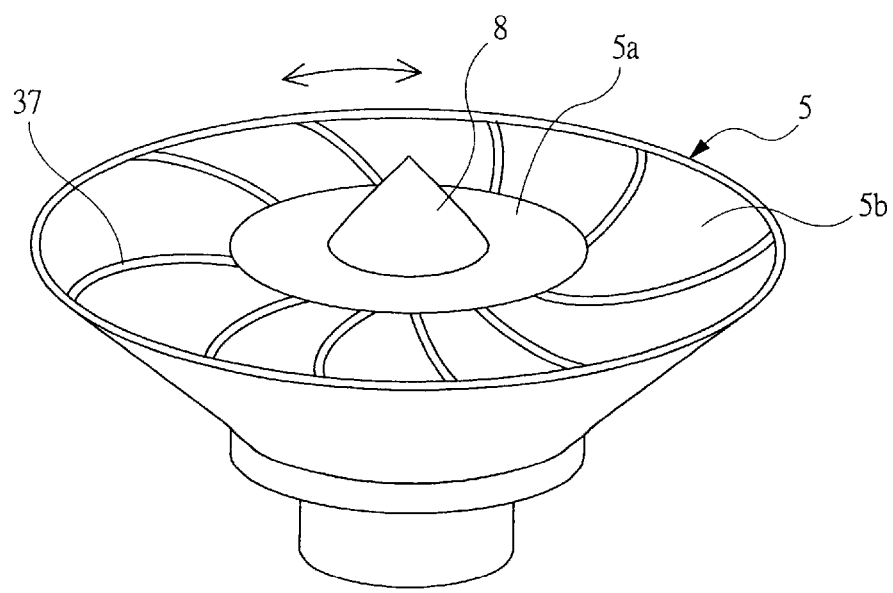
FIG. 21 is a perspective view of the rotating disk in FIG. 20.
Figures 22A, 22B:
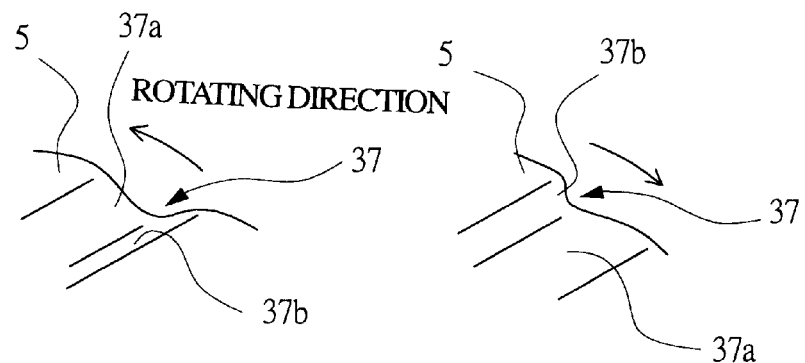
FIG. 22A is an explanatory view of a slip prevention groove, and is used for a left-hand rotation.
FIG. 22B is an explanatory view of a slip prevention groove, and is used for a right-hand rotation.

Further, as a fifth embodiment, explanation will be made of an apparatus adding a slip prevention means to the rotating disk 5. FIG. 20 is an explanatory view showing a constitution of a rotating disk that is a fifth embodiment of the present invention and which is seen from above. FIG. 21 is a perspective view thereof. FIGS. 22A and 22B and FIG. 23 are each a explanatory view showing a constitution of a slip prevention groove. A constitution except for the rotating disk 5 is the same as the constitution of the CF apparatus shown in FIG. 1 or FIG. 15.

In the apparatus shown in FIG. 1 and FIG. 15, the surface of the rotating disk 5 is formed in a smooth surface, that is, in such a state that surface roughness thereof is smaller, in order to perform the spherical granulation effectively. However, as described above, if the entire surface of the rotating disk 5 is smooth, then the powder grains are easy to slip on the surface thereof and so, in turn, impede tumbling motion.

Figures 23A, 23B:
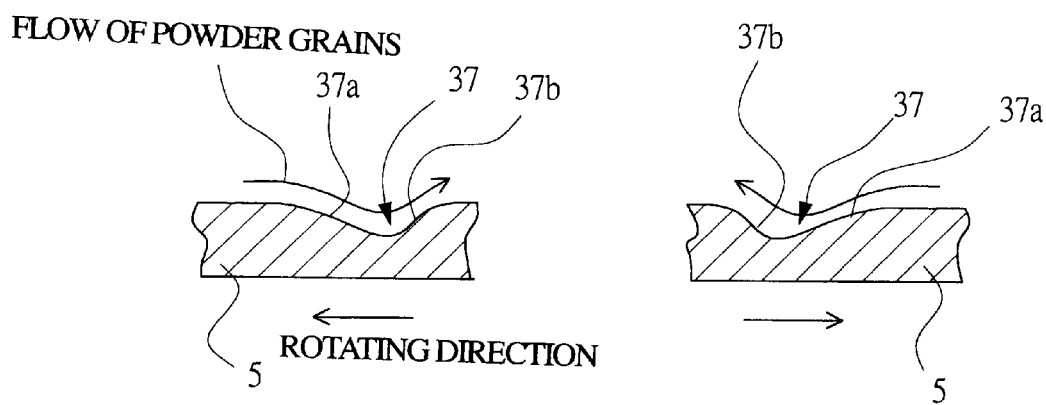
FIG. 23A is a cross-sectional view of a slip prevention groove, and is used for a left-hand rotation.
FIG. 23B is a cross-sectional view of a slip prevention groove, and is used for a right-hand rotation.

Thereupon, in the fifth embodiment, as shown in FIG. 20 and FIG. 21, slip prevention grooves (slip prevention means) 37 are provided on the rotating disk 5, and thereby strengthening gripping force is achieved. That is, in the above-mentioned apparatus, the slip prevention grooves 37 are radially and spirally formed on the entire surface of the powder contact portion of the rotating disk 5, and the powder grains are led therein and thereby the tumbling action is promoted. Each slip prevention groove 37 is formed as a strip-like groove of about 0.5 to 2 mm, on the smoothly formed surface of the rotating disk 5. The sectional shape of each slip prevention groove 37 is set as corresponding to rotating directions of the rotating disk 5, and a side wall 37a located in a front side of the rotating directions is formed to have a moderate slope, and a side wall 37b located in a rear side thereof is formed to have a steep slope. That is, in the case where the rotating disk 5 shown in FIG. 20 rotates in a left-hand direction, each groove is formed as shown in FIG. 22A and FIG. 23A, and in the case of a right-hand rotation, each groove is formed as shown in FIG. 22B and FIG. 23B.

Thus, since the slip prevention grooves 37 are formed on the rotating disk 5, the powder grains disposed on the rotating disk 5 are spherically granulated on the smooth surface portion thereof and, at the same time, tumbling of the powder grains is promoted by the slip prevention grooves 37. That is, slipping of the powder grains is prevented and the centrifugal gripping force is strengthened, so that tumbling of the powder grains is activated. It is therefore possible to centrifugally tumble and granulate, or powder-coat the powder grains certainly, and achieve high speed rotation of rotating disk, tight granules, improvement in processing capacity of small quantity, and the like.

On the other hand, in the fifth embodiment, the rotating disk 5 is shown in which concave grooves are formed as the slip prevention means but alternatively the slip prevention means may be formed in a ridge-like convex portion. Moreover, strip-like grooves may be provided not in the entire surface of the powder contact portion of the rotating disk 5 but a part thereof, for example, the peripheral part thereof. Further, each slip prevention groove 37 is not limited to a curved form as shown in FIG. 20, and may be a form that is extended radially and linearly.

As a slip prevention means, whole or a part of the surface of the rotating disk 5 may be formed in a pear-skin shape or a baffle may be disposed on the rotating disk 5.

Sixth Embodiment

Figure 24:
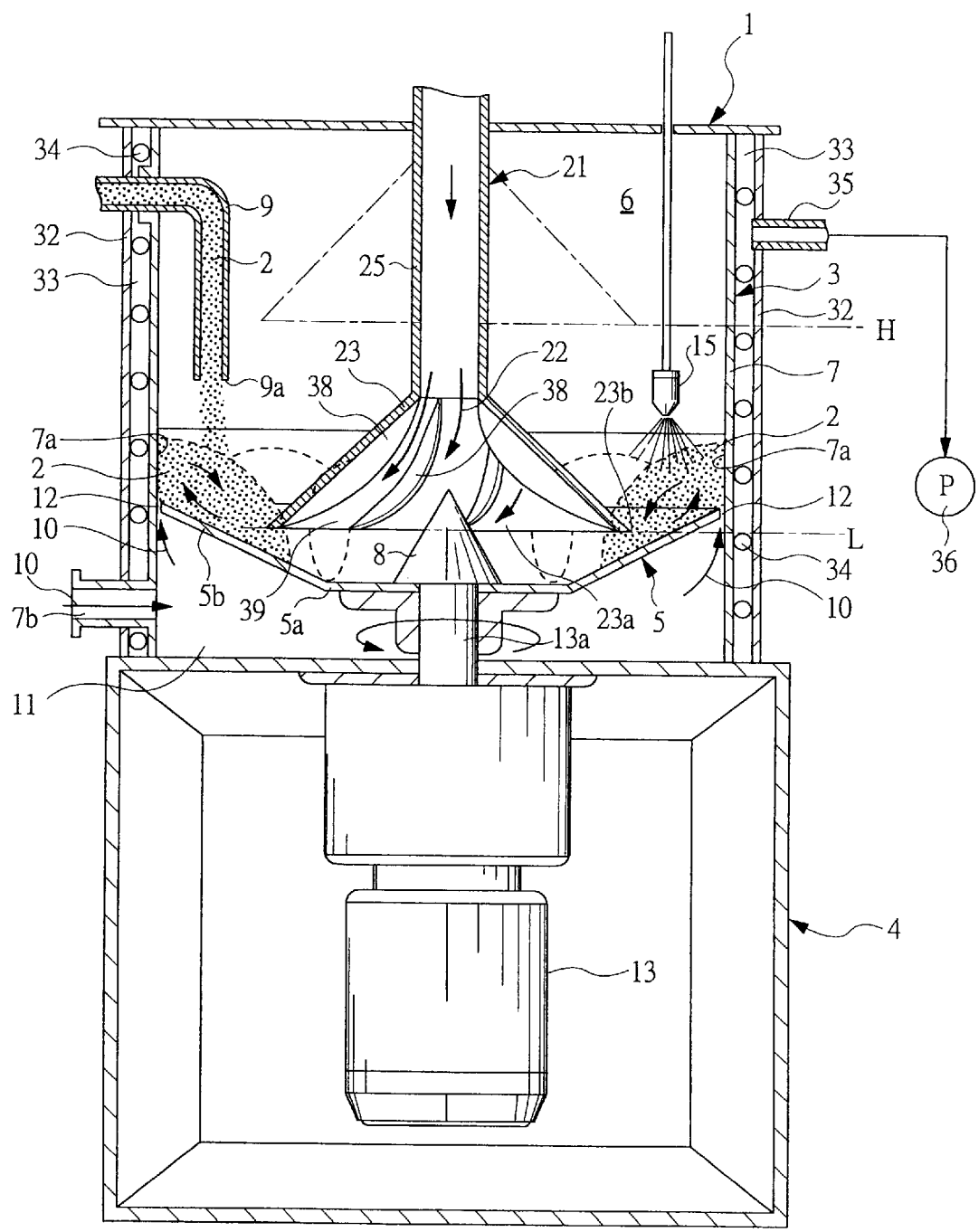
FIG. 24 is an explanatory view showing a constitution of a CF apparatus that is a sixth embodiment of the present invention.
Figure 25:
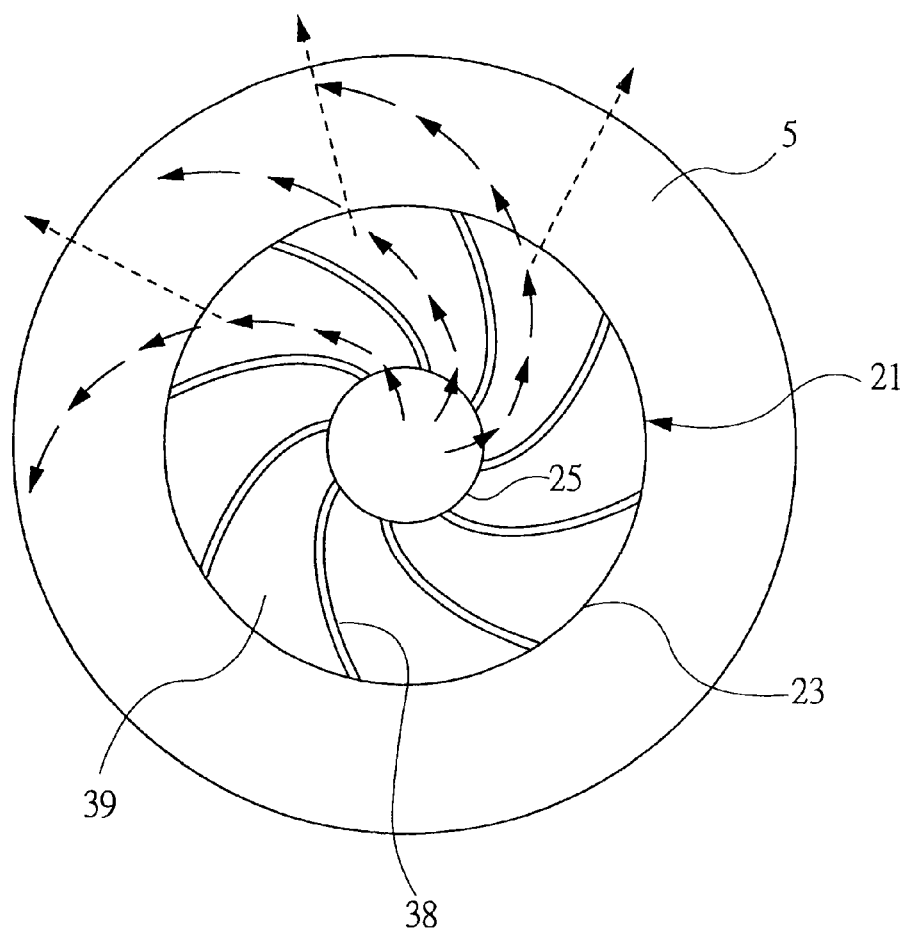
FIG. 25 is an explanatory view showing an air-sending state of air sent from an air supply device.

Additionally, in a sixth embodiment, explanation will be made of the apparatus in which a swirl flow generating means is added to the air supply device 21. FIG. 24 is an explanatory view showing a constitution of the CF apparatus that is a sixth embodiment of the present invention. FIG. 25 is an explanatory view showing an air blast state flowing from the air supply device.

In the apparatus shown in FIG. 1 or FIG. 15, an air blast from the air supply device 21 is supplied onto the rotating disk 5 in a vertical direction, and is presented for granulation or drying. However, since the air blast is linear as mentioned above, the air blast is easy to pass through over the rotating disk 5 and the circulating time on the rotating disk tends to be shorter.

Thereupon, in the sixth embodiment, as shown in FIG. 24 and FIG. 25, the air supply device 21 is provided with agitators (wind introducing plates) 38 to generate a swirl air stream, and enhancement of the processing efficiency is achieved. That is, in the above-mentioned apparatus, a plurality of agitators 38 is provided in the air supply port 23 of the air supply device 21, and thereby a swirl wind is supplied onto the rotating disk 5. Each agitator 38 is a crescent-like steel plate having a thickness of about 5 to 10 mm, and is radially arranged on the inner wall of the air supply port 23. Between the adjacent agitators 38, a wind introducing path 39 is formed radially and spirally.

These wind introducing paths 39 are formed from the upper portion of the air supply port 23 toward the opening portion 23a. The air stream passing through these paths becomes a swirl air stream as shown in FIG. 25, and is supplied onto the rotating disk 5. As a result, swirl motion can be given to the respective powder grains on the rotating disk 5, and the powder grains are wound up in a spiral-rotation shape so as to twist a rope. Therefore, it is possible to promote tumbling of the powder grains and to achieve improvement of the processing efficiency. It is also possible to prevent the air stream from blowing through straightly as indicated by broken lines in FIG. 25, and thereby to lengthen contact time between the air stream and the respective powder grains. Therefore, since stay time when the air stream stays in the powder grain layer lengthens, the drying efficiency thereof can be enhanced.

It is preferable that, in the apparatus shown in FIGS. 1, 2, 3, 5, 8 and 10, agitators are installed on the inner wall of the air supply port 23 in the air supply device 21, and, in the apparatus shown in FIGS. 4, 7, 9, or 11, agitators are installed on the inner wall located in a lower end side of the straight tube portion 25. Further, in the apparatus shown in FIG. 6, agitators are installed on the inner wall located in the lower end side of the taper expanded portion.

On the other hand, in the apparatus shown in FIGS. 12, 13, 18 or 19, a swirl air stream can be obtained by disposing obliquely the branch pipe 28 or the straight tube portion 25 toward a rotating direction thereof and by supplying the air onto the rotating disk 5 along the rotating direction. However, agitators may be provided on the wall located in the lower end portion of the branch pipe 28 or the straight tube portion 25. Further, in the apparatus shown in FIG. 14, a swirl air stream can be obtained by mounting obliquely the air blast tube of the air supply device 21 on the fixed wall 7. In this case, it is more effective that the air supply device 21 is disposed in a tangential direction of the fixed wall 7 and the dry air 22 is supplied in a tangential direction of the rotating disk 5.

Each shape of the agitators 37 is not limited to a crescent shape, and as far as the wind introducing paths 39 each having a radial and spiral shape can be formed, a square shape formed by twisting a strip-shape plate member may be also used, for example.

As described above, the inventions made by the present inventors have been concretely explained on the basis of the embodiments. However, the present inventions are not limited to these embodiments, and needless to say may be changed and modified without departing from the gist thereof.

For example, it is also possible to provide at least one baffle or guide plate for adjusting the tumbling action, inside the fixed wall 7. Moreover, sensors for detecting temperature, humidity, contents accumulating amounts, or the like may be provided in the centrifugal tumbling chamber 6 in order to control each step performed by the CF apparatus 1. Further, filters such as bag filters, cartridge filters or the like, or cyclone, or the like may be provided therein, or a device for performing heating, cooling, dehumidifying or the like of the dry air 22 or the slit air 10 may be provided. In addition, it is possible to provide a temperature adjusting means of jacket or the like outside of the fixed wall 7.

The above-mentioned embodiments and modified examples are mere examples of the present invention, and also the combination of the air supply device 21 and the rotating disk 5 is not limited to the above-mentioned examples. Needless to say, the first to sixth embodiments may be properly combined, for example, by using the air supply device 21 shown in FIG. 1 in the rotating disk 5 shown in FIG. 4.

INDUSTRIAL APPLICABILITY

According to the centrifugal tumbling granulating apparatus and the powder grain processing method that are the present invention, the air supply device for supplying dry air is provided above the rotating disk, and the granulated substances are dried by this dry air. Therefore, since the granulated substances can be dried inside the same apparatus, it is unnecessary to perform the drying processing by transferring the granulated substances to other drying devices and thereby improvement of productivity thereof can be achieved. In this case, the products granulated come to heavy spherical particles that can not be obtained by the conventional multifunction type granulating coating apparatus, and of which each particle size is small, and which exist within a narrow range of the particle size distribution. Accordingly, it is possible to product efficiently spherical particles with high quality.

Also according to the centrifugal tumbling granulating apparatus of the present invention, since the fixed wall is surrounded by an outer wall and an adiabatic space is formed between the fixed wall and the outer wall, heat conduction is cut off by this adiabatic space and it is possible to suppress heat conduction of the air to the fixed wall. Therefore, the fixed wall is cooled by the air, and thereby it is possible to prevent dewing from being generated on the surface thereof and to suppress adhesion of the powder grains to the inner surface of the fixed wall. As a result, the cleaning jobs are alleviated, the product yield and the apparatus operation efficiency are improved, and improvement of the production efficiency or the like can be achieved.

Further, by providing the powder contact portion of the rotating disk with a slip prevention means, the powder grains are prevented from slipping on the rotating disk, and the centrifugal gripping force is strengthened, and the tumbling of the powder grains is activated. Therefore, the powder grains can be centrifugally tumbled and granulated certainly, and high speed rotation of the rotating disk, tight granules, improvement of processing capacity of small quantity, and the like can be achieved.

In addition, by providing the air supply means with the a swirl flow generating means for supplying swirl wind onto the rotating disk, it is possible to give swirl motion to the powder grains located on the rotating disk, and to promote the tumbling of the powder grains, and to achieve improvement of the processing efficiency. The air stream is also prevented from blowing through straightly, and the contact time between the air stream and the respective powder grains can be lengthened, and the stay time of the air stream staying in the powder grain layers can be lengthened, and thereby the drying efficiency can be enhanced.

What is claimed is:

1. A centrifugal tumbling granulating apparatus comprising:
   a fixed wall having a grain contact portion which is in contact with powder grains and of which a horizontal section is formed at least in a circular shape;
   a rotating disk provided a predetermined clearance away from an inner side of said fixed wall and rotating in a horizontal direction by a rotary driving mean; and
   an air supply means disposed above said rotating disk and close to said rotating disk and supplying gas to an upper surface side of said rotating disk,
   wherein said air supply means is provided to be movable in an up-and-down direction between a lower position close to said rotating disk and an upper position more remote from said rotating disk than said lower position.

2. The centrifugal tumbling granulating apparatus according to claim 1, wherein said air supply means supplies gas to said rotating disk from above the central part of said rotating disk.

3. The centrifugal tumbling granulating apparatus according to claim 2, wherein said air supply means has a cylindrical straight tube portion, and an air supply port which communicates with said straight tube portion and is disposed below said straight tube portion and of which a lower end side is enlarged in a radius direction of said portion and is formed like a cone.

4. The centrifugal tumbling granulating apparatus according to claim 1, wherein said air supply means supplies gas to said rotating disk from above a peripheral part of said rotating disk.

5. The centrifugal tumbling granulating apparatus according to claim 1, wherein said air supply means is disposed in such a state that a part thereof enters in to a particle layer of said powder grains.

6. The centrifugal tumbling granulating apparatus according to claim 1, wherein said rotating disk has such a vertical section that a peripheral part thereof faces a center thereof and is inclined downward.

7. The centrifugal tumbling granulating apparatus according to claim 1, wherein said rotating disk has a projecting portion in a central part thereof.

8. The centrifugal tumbling granulating apparatus according to claim 1, wherein gas is supplied to said clearance formed between said fixed wall and said rotating disk, from a lower direction thereof to an upper direction.

9. The centrifugal tumbling granulating apparatus according to claim 1, wherein said fixed wall has a dewing prevention means for preventing an inner surface of said fixed wall from being dewed.

10. The centrifugal tumbling granulating apparatus according to claim 9, wherein said dewing prevention means comprises an outer wall surrounding said fixed wall, and an adiabatic space formed between said fixed wall and said outer wall.

11. The centrifugal tumbling granulating apparatus according to claim 10, wherein said dewing prevention means further comprises a pump device for sucking air from the inside of said adiabatic space.

12. The centrifugal tumbling granulating apparatus according to claim 10, wherein said adiabatic space is filled with gas having lower pressure than atmospheric pressure.

13. The centrifugal tumbling granulating apparatus according to claim 12, wherein the gas in said adiabatic space has a pressure of 1.33 Pa or less.

14. The centrifugal tumbling granulating apparatus according to claim 1, wherein the powder contact portion of said rotating disk is formed to have a smooth surface.

15. The centrifugal tumbling granulating apparatus according to claim 1, wherein a slip prevention means for preventing the powder grains on said powder contact portion from slipping is provided in the powder contact portion of said rotating disk.

16. The centrifugal tumbling granulating apparatus according to claim 15, wherein said slip prevention means is a strip-like groove radially formed in the powder contact portion of said rotating disk.

17. The centrifugal tumbling granulating apparatus according to claim 16, wherein said strip-like groove is formed such that a side wall of a front side along a rotating direction of said rotating disk is smoother than that of a rear side along said rotating direction.

18. The centrifugal tumbling granulating apparatus according to claim 1, wherein said air supply means is provided with a swirl flow generating means for supplying swirl wind onto said rotating disk.

19. The centrifugal tumbling granulating apparatus according to claim 18, wherein said swirl flow generating means is a wind introducing plate arranged in said air supply means.

20. The centrifugal tumbling granulating apparatus according to claim 1, wherein said air supply means is disposed in such a state as to incline toward a rotating direction of said rotating disk from above said rotating disk, and supplies gas onto said rotating disk along the rotating direction to thereby form a swirl air stream.

21. A powder grain processing method comprising the steps of:

charging the powder grains into a rotating disk of a centrifugal tumbling and granulating apparatus, the apparatus comprising: a fixed wall having a grain contact portion which is in contact with the powder grains and of which a horizontal section is formed at least in a circular shape; the rotating disk provided a predetermined clearance away from an inner side of said fixed wall and rotating in a horizontal direction by a rotary driving means; and an air supply means disposed above said rotating disk and provided to be movable in a up-and-down direction between a lower position close to said rotating disk and an upper portion more remote from said rotating disk than said lower position;

rotating said rotating disk while gas is supplied to an upper direction of said clearance from a lower direction thereof;

supplying at least one of solvent, solution, dispersion solution, and dissolved solution, and then performing one of granulation and coating of said powder grains; and drying granulated substances of said powder grains by supplying gas to an upper surface side of said rotating disk from said air supply means.

22. The powder grain processing method according to claim 21, wherein a swirl air stream is supplied from said air supply means.

23. The powder grain processing method according to claim 21, wherein powders are further supplied into said centrifugal tumbling and granulating apparatus.

24. The powder grain processing method according to claim 21, wherein said drying step is performed with said air supply means being disposed at said low position.

25. The powder grain processing method according to claim 24, wherein at least one of the granulating step and coating step is performed, with said air supply means being disposed at said upper position.

26. The powder grain processing method according to claim 21, wherein at least one of the granulating step and the coating step is performed, with said air supply means being disposed at said lower position close to said rotating disk.

27. The powder grain processing method according to claim 21, wherein supply of gas from said air supply means is stopped in one of said granulating step and coating step.

28. The powder grain processing method according to claim 21, wherein gas is supplied from said air supply means in one of said granulating step and coating step.

* * * * *

UNITED STATES PATENT AND TRADEMARK OFFICE
CERTIFICATE OF CORRECTION

PATENT NO. : 6,745,960 B1
DATED : June 8, 2004
INVENTOR(S) : Nagayoshi Myo et al.

It is certified that error appears in the above-identified patent and that said Letters Patent is hereby corrected as shown below:

Column 22,
Line 28, please replace "low" with -- lower --.

Signed and Sealed this

Third Day of August, 2004

JON W. DUDAS
*Acting Director of the United States Patent and Trademark Office*